United States Patent
Ishikawa

(10) Patent No.: US 11,831,204 B2
(45) Date of Patent: Nov. 28, 2023

(54) ROTOR, MOTOR, COMPRESSOR, AND AIR CONDITIONER

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 680 days.

(21) Appl. No.: 17/048,322

(22) PCT Filed: May 10, 2018

(86) PCT No.: PCT/JP2018/018085
§ 371 (c)(1),
(2) Date: Oct. 16, 2020

(87) PCT Pub. No.: WO2019/215865
PCT Pub. Date: Nov. 14, 2019

(65) Prior Publication Data
US 2021/0175761 A1 Jun. 10, 2021

(51) Int. Cl.
*H02K 1/27* (2022.01)
*F24F 5/00* (2006.01)
(Continued)

(52) U.S. Cl.
CPC ............ *H02K 1/276* (2013.01); *F24F 5/001* (2013.01); *F25B 1/005* (2013.01); *H02K 3/02* (2013.01); *H02K 21/14* (2013.01); *H02K 29/03* (2013.01)

(58) Field of Classification Search
CPC .......... H02K 21/14; H02K 1/276; H02K 3/02; H02K 29/03; H02K 2213/03; F24F 5/001; F25B 1/005; F25B 1/00
(Continued)

(56) References Cited

U.S. PATENT DOCUMENTS 8,937,420 B2 * 1/2015 Yabe .................... H02K 29/03
310/156.56
9,178,392 B2 * 11/2015 Yabe .................... H02K 1/2706
(Continued)

FOREIGN PATENT DOCUMENTS

CN 101728914 A 6/2010
CN 107534335 A 1/2018
(Continued)

OTHER PUBLICATIONS

Office Action dated Jan. 12, 2023 in connection with counterpart Chinese Patent Application No. 201880092874.0 (and English machine translation).
(Continued)

*Primary Examiner* — Alex W Mok
(74) *Attorney, Agent, or Firm* — POSZ LAW GROUP, PLC

(57) ABSTRACT

A rotor core has first and second core parts in an axial direction. The first and second core parts have first and second magnet insertion holes in which rare earth magnets are disposed. A width of the first magnet insertion hole is wider than the second magnet insertion hole. The first core part has one or more slits elongated in the radial direction, the number of which is N1 (≥1), on a radially outer side of the first magnet insertion hole. The second core part has no, one or more slits elongated in the radial direction, the number of which is N2 (≥0), on a radially outer side of the second magnet insertion hole. N1>N2 is satisfied. A ratio of a length of the second core part in the axial direction to that of the rotor core is greater than or equal to 70% and less than 100%.

17 Claims, 16 Drawing Sheets

(51) Int. Cl.
*F25B 1/00* (2006.01)
*H02K 21/14* (2006.01)
*H02K 3/02* (2006.01)
*H02K 1/276* (2022.01)
*H02K 29/03* (2006.01)

(58) Field of Classification Search
USPC .................................................... 310/156.56
See application file for complete search history.

(56) References Cited

U.S. PATENT DOCUMENTS

| | | | | |
|---|---|---|---|---|
| 9,472,986 | B2* | 10/2016 | Tsuchida | H02K 1/246 |
| 2010/0156227 | A1 | 6/2010 | Hung | |
| 2011/0012461 | A1* | 1/2011 | Tomigashi | H02K 1/276 |
| | | | | 310/156.01 |
| 2012/0242182 | A1* | 9/2012 | Yabe | H02K 1/276 |
| | | | | 310/156.53 |
| 2013/0113318 | A1* | 5/2013 | Nishiyama | H02K 21/44 |
| | | | | 310/114 |
| 2016/0315512 | A1 | 10/2016 | Fubuki | |
| 2018/0062462 | A1 | 3/2018 | Ishikawa et al. | |

FOREIGN PATENT DOCUMENTS

| | | |
|---|---|---|
| JP | 2005-354899 A | 12/2005 |
| JP | 2009-219291 A | 9/2009 |
| JP | 2014-193065 A | 10/2014 |
| JP | 2015-116105 A | 6/2015 |
| WO | 2016/203530 A1 | 12/2016 |

OTHER PUBLICATIONS

Office Action dated Oct. 28, 2022 in connection with counterpart Chinese Patent Application No. 201880092874.0 (and English machine translation).

* cited by examiner

RATIO OF LENGTH OF SECOND CORE PART IN
AXIAL DIRECTION TO THAT OF ROTOR CORE

ROTOR, MOTOR, COMPRESSOR, AND AIR CONDITIONER

CROSS REFERENCE TO RELATED APPLICATION

This application is a U.S. national stage application of International patent Application No. PCT/JP2018/018085 filed on May 10, 2018, the disclosure of which is incorporated herein by reference.

TECHNICAL FIELD

The present invention relates to a rotor, a motor, a compressor, and an air conditioner.

BACKGROUND

With an increase in capacity of a compressor for a large-sized air conditioner such as a commercial air conditioner, it is required to increase a rotation speed of a motor. When the rotation speed of the motor is increased, a frequency of a current flowing through a winding of the motor increases. In a permanent-magnet-embedded motor having a rare earth magnet as a permanent magnet, an eddy current may be generated in the permanent magnet at a high frequency range, and the motor efficiency may be reduced. Thus, it is an aim to reduce the eddy current.

Patent Reference 1 discloses a rotor core having a magnet hole into which a permanent magnet is inserted. On an inner surface of the magnet hole, a part in contact with the permanent magnet and a part not in contact with the permanent magnet are alternately provided in the axial direction. Patent Reference 2 discloses a rotor having permanent magnets finely divided in the axial direction and circumferential direction.

PATENT REFERENCE

[Patent Reference 1]: Japanese Patent Application Publication No. 2015-116105 (see FIG. 4)
[Patent Reference 2]: Japanese Patent Application Publication No. 2005-354899 (see FIG. 5)

However, in a configuration described in Patent Reference 1, there are many portions where the inner surface of the magnet hole and the permanent magnet do not contact each other. Thus, the magnetic flux of the permanent magnet is less likely to reach a stator through the rotor core. Thus, the magnetic flux effectively interlinking with the winding of the stator decreases, which leads to a reduction in the magnetic force. In a configuration described in Patent Reference 2, a leakage magnetic flux is more likely to occur between the permanent magnets divided in the circumferential direction, which also leads to a reduction in the magnetic force.

SUMMARY

The present invention is intended to solve the above described problems, and an object of the present invention is to reduce an eddy current loss while suppressing the reduction in the magnetic force.

A rotor of the present invention includes a rotor core having an annular shape about an axis, the rotor core having a first core part and a second core part in a direction of the axis, the first core part having a first magnet insertion hole, and the second core part having a second magnet insertion hole, a first permanent magnet disposed in the first magnet insertion hole and being formed of a rare earth magnet, and a second permanent magnet disposed in the second magnet insertion hole and being formed of a rare earth magnet. A width of the first magnet insertion hole in a radial direction about the axis is wider than a width of the second magnet insertion hole in the radial direction. The first core part has one or more slits, a number of which is N1, on an outer side of the first magnet insertion hole in the radial direction. The number N1 is greater than or equal to one. Each of the slits has a length in the radial direction longer than a length in a circumferential direction about the axis. The second core part has no, one or more slits, a number of which is N2, on an outer side of the second magnet insertion hole in the radial direction. The number N2 is greater than or equal to zero. Each of the slits has a length in the radial direction longer than a length in the circumferential direction. N1>N2 is satisfied. A ratio of a length of the second core part in the direction of the axis to a length of the rotor core in the direction of the axis is greater than or equal to 70% and less than 100%.

In the present invention, the rotor core includes the first core part having the slits the number of which is N1, and the second core parts having the slits the number of which is N2 (<N1), and the ratio of the length of the second core part in the axial direction to the length of the rotor core in the axial direction is greater than or equal to 70% and less than 100%. Thus, the eddy current loss can be reduced. Further, a leakage magnetic flux can be reduced, and thus the reduction of the magnetic force can be suppressed, as compared to a case where the permanent magnet is divided in the circumferential direction. In addition, the second permanent magnet can be formed to be thinner than the first permanent magnet, and thus the manufacturing cost can be reduced.

DETAILED DESCRIPTION

First Embodiment (Configuration of Motor)

Figure 1A:
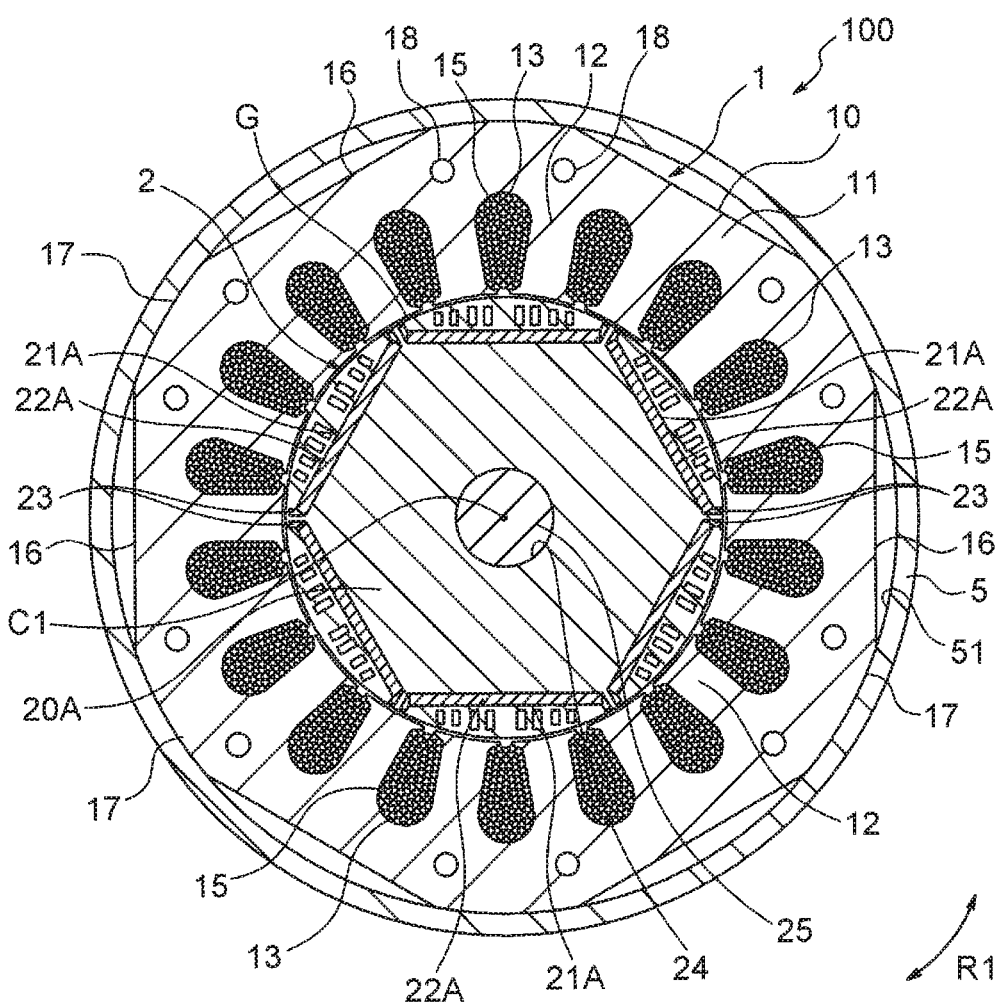
FIG. 1(A) is a cross-sectional view showing a motor of a first embodiment and FIG. 1(B) is a schematic view showing a cross-sectional structure of a winding.

FIG. 1(A) is a cross-sectional view showing a motor 100 of a first embodiment. The motor 100 shown in FIG. 1(A) is incorporated inside a cylindrical shell 5. The shell 5 is a part of a container of a compressor 500 (FIG. 18) in which the motor 100 is incorporated.

The motor 100 includes a rotatable rotor 2 and a stator 1 provided so as to surround the rotor 2. The stator 1 is incorporated inside the above-described shell 5. An air gap (i.e., a gap) G of, for example, 0.5 mm is provided between the stator 1 and the rotor 2.

Hereinafter, a direction of an axis C1, which is a rotation axis of the rotor 2, is referred to as an "axial direction". A direction along a circumference about the axis C1 is referred to as a "circumferential direction". A radial direction about the axis C1 is referred to as a "radial direction". FIG. 1 is a sectional view (i.e., a cross-sectional view) taken along a plane perpendicular to the axis C1.

(Configuration of Stator)

The stator 1 includes a stator core 10 and a winding 15 wound on the stator core 10. The stator core 10 is formed of a plurality of stack elements which are stacked in the axial direction and fastened by crimping or the like. The stack element is a punched electromagnetic steel sheet having a thickness of, for example, 0.25 to 0.5 mm.

The stator core 10 includes a yoke 11 having an annular shape about the axis C1 and a plurality of teeth 12 protruding inward in the radial direction from the yoke 11. The number of teeth 12 is 18 in this example, but is not limited to 18. The winding 15 is wound around the tooth 12 of the stator core 10 via a not shown insulating portion (insulator). Slots 13 for accommodating the winding 15 are formed each between two teeth 12 adjacent to each other in the circumferential direction.

Figure 1B:
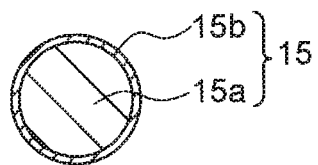

FIG. 1(B) is a schematic diagram showing a cross-sectional structure of the winding 15. The winding 15 includes a conductor 15a formed of aluminum or copper, and a refrigerant-resistant insulating film 15b covering a circumference of the conductor 15a. The winding 15 is in contact with the refrigerant inside the compressor 500 (FIG. 18), and the conductor 15a is protected by the refrigerant-resistant insulating film 15b. A method for winding the winding 15 may be either distributed winding in which the winding is wound across the plurality of teeth 12 or concentrated winding in which the winding is wound around each tooth 12.

A plurality of abutting surfaces 17 which are cylindrical surfaces about the axis C1 and a plurality of cutout portions 16 which are flat surfaces parallel to the axis C1 are formed on an outer circumference of the stator core 10. The plurality of abutting surfaces 17 and the plurality of cutout portions 16 are alternately formed in the circumferential direction. Each of the number of abutting surfaces 17 and the number of cutout portions 16 is six in this example, but is not limited to six.

The abutting surfaces 17 are fitted to an inner circumferential surface 51 of the shell 5. A clearance is formed between the cutout portion 16 and the inner circumferential surface 51 of the shell 5. The clearance serves as a refrigerant flow passage through which refrigerant in the compressor 500 flows in the axial direction.

(Configuration of Rotor)

The rotor 2 includes a rotor core 20 having an annular shape about the axis C1. The rotor core 20 has an outer circumferential surface which is cylindrical about the axis C1. A shaft hole 24 is formed at a center of the rotor core 20 in the radial direction. A rotational shaft 25 is fixed into the shaft hole 24 by press-fitting.

Figure 6:
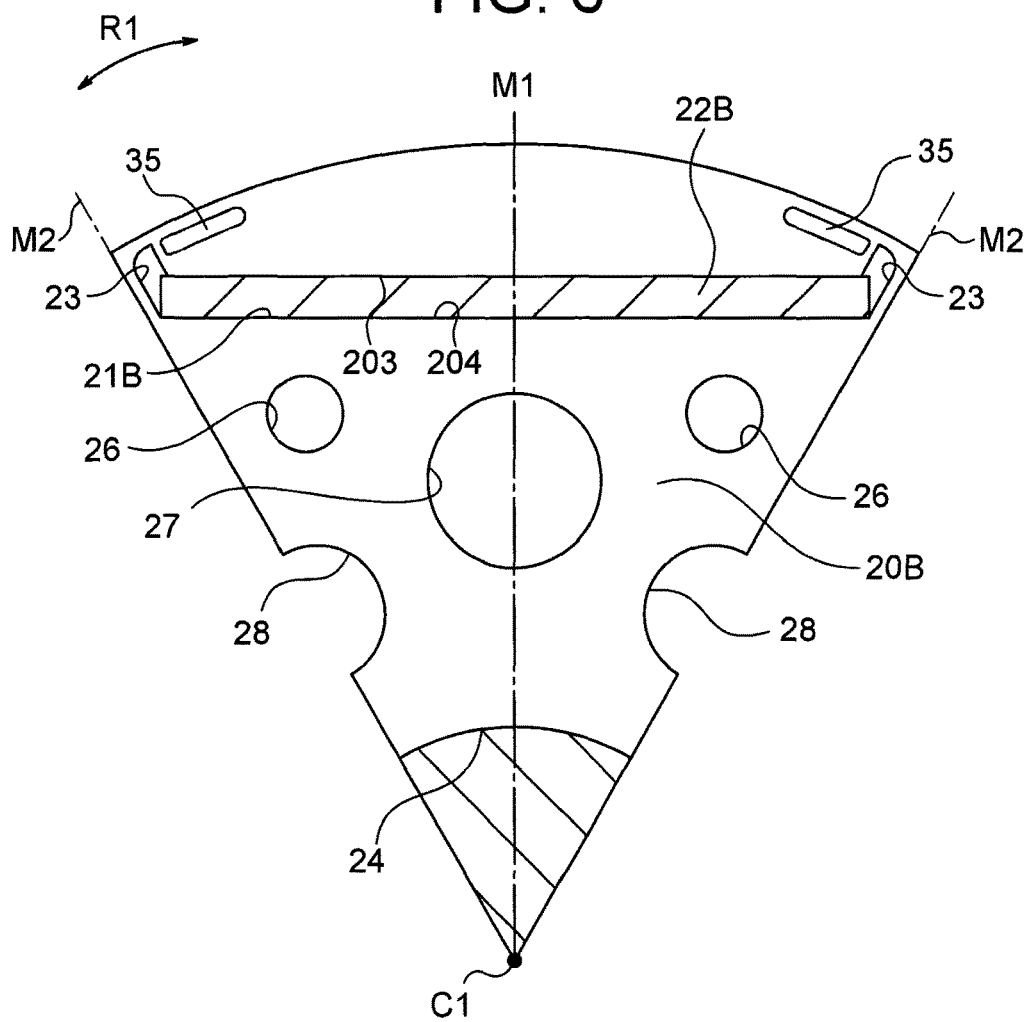
FIG. 6 is a longitudinal sectional view taken along a line VI-VI in FIG. 3 as seen in a direction indicated by arrows.

The rotor 2 has a plurality of magnetic poles in the circumferential direction. The number of magnetic poles is equal to the number of first permanent magnets 22A to be described later, and also equal to the number of second permanent magnets 22B (FIG. 6). In this example, the number of magnetic poles of the rotor 2 is six. The number of magnetic poles of the rotor 2 is not limited to six, and it is sufficient that the number of magnetic poles of the rotor 2 is two or more.

Figure 2:
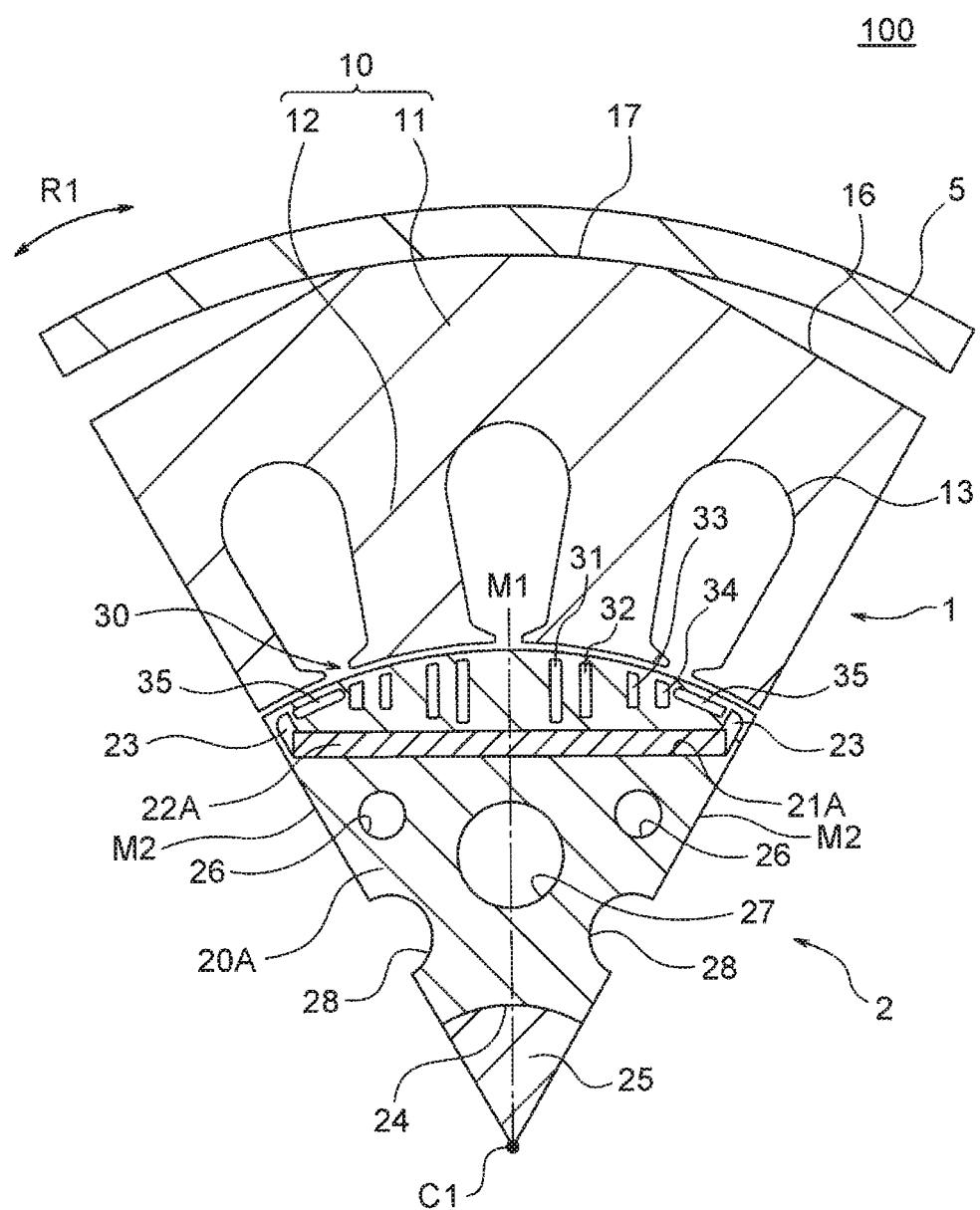
FIG. 2 is a cross-sectional view showing a portion corresponding to one magnetic pole of the motor of the first embodiment.

FIG. 2 is a cross-sectional view showing a portion corresponding to one magnetic pole of the rotor 2 and a part of the stator 1 facing this portion via the air gap. In FIG. 2, a straight line in the radial direction that passes through a center of the magnetic pole of the rotor 2 is defined as a magnetic pole center line M1. A boundary between adjacent magnetic poles (i.e., an inter-pole portion) is denoted by reference character M2.

Figure 3:
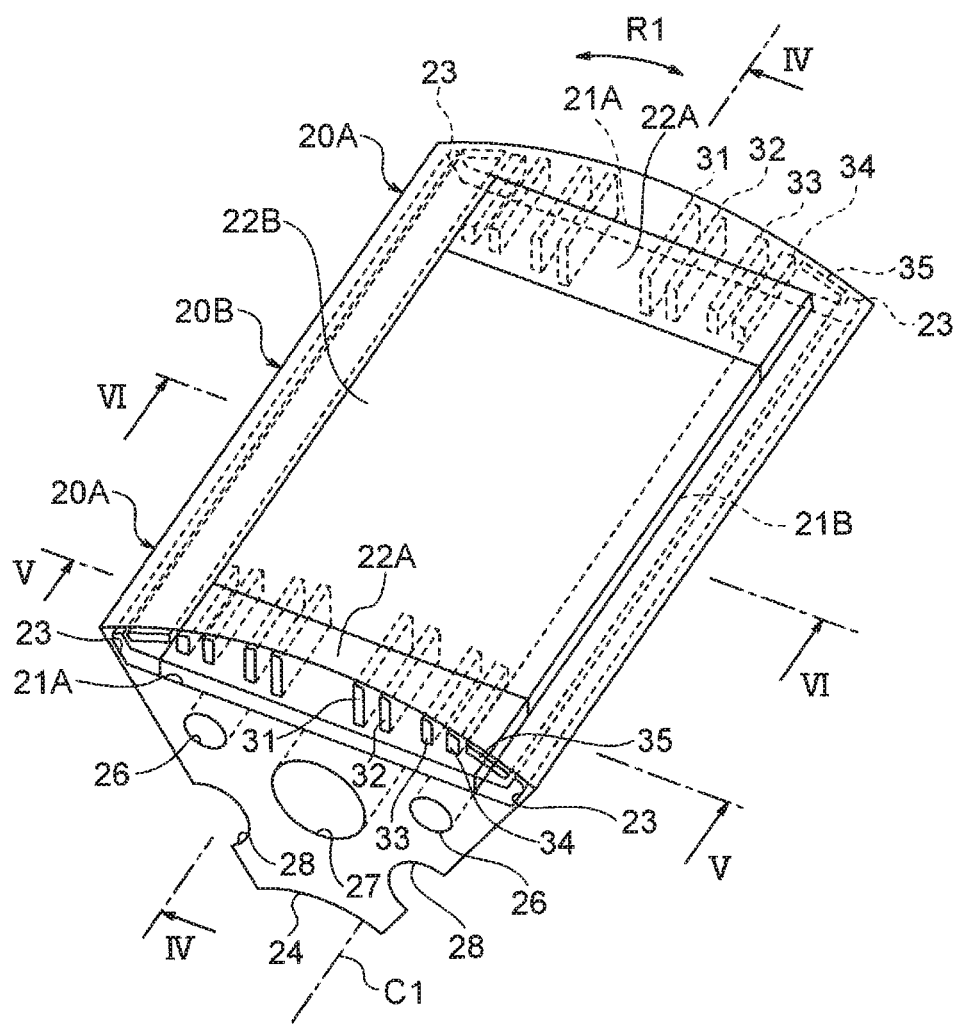
FIG. 3 is a perspective view schematically showing a portion corresponding to one magnetic pole of a rotor of the first embodiment.
Figure 4:
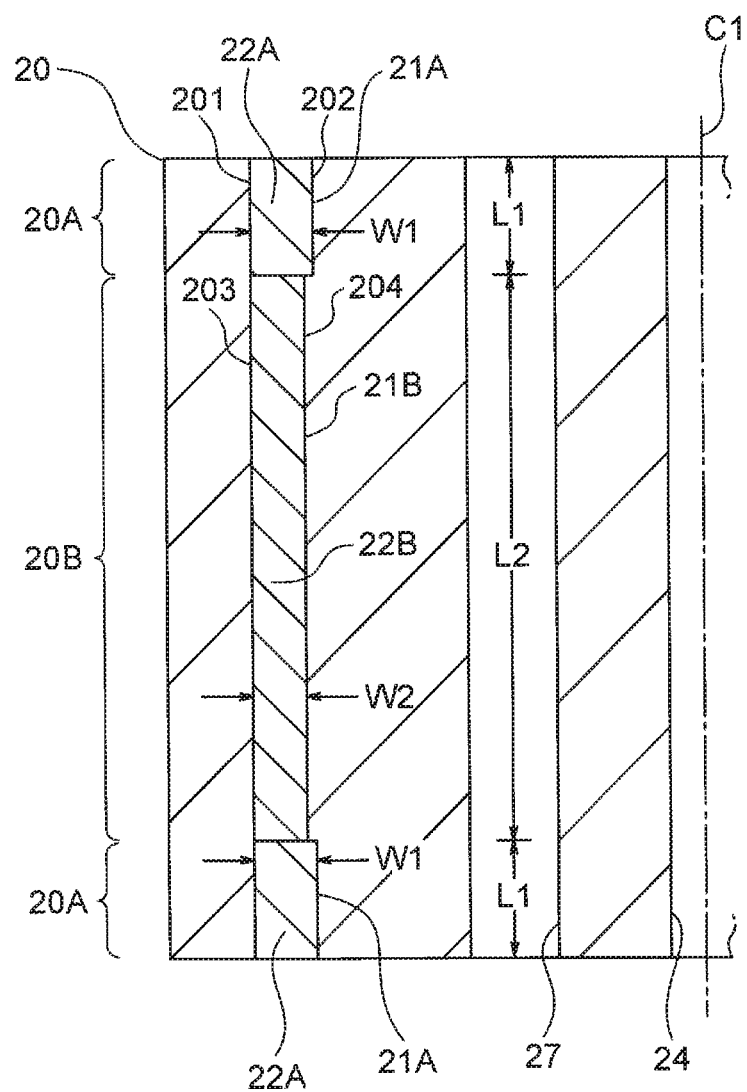
FIG. 4 is a longitudinal sectional view taken along a line IV-IV in FIG. 3 as seen in a direction indicated by arrows.

FIG. 3 is a perspective view schematically showing a portion corresponding to one magnetic pole of the rotor 2. FIG. 4 is a cross-sectional view taken along a line IV-IV in FIG. 3 as seen in a direction indicated by arrows, i.e., a longitudinal sectional view of the rotor 2. In FIG. 3, the first permanent magnets 22A and the second permanent magnet 22B of the rotor 2 are shown by solid lines.

As shown in FIGS. 3 and 4, the rotor core 20 includes two first core parts 20A and one second core part 20B in the axial direction. More specifically, the one second core part 20B is disposed between the two first core parts 20A in the axial direction. Each first core part 20A has a length L1 in the axial direction, while the second core part 20B has a length L2 in the axial direction.

Figure 5:
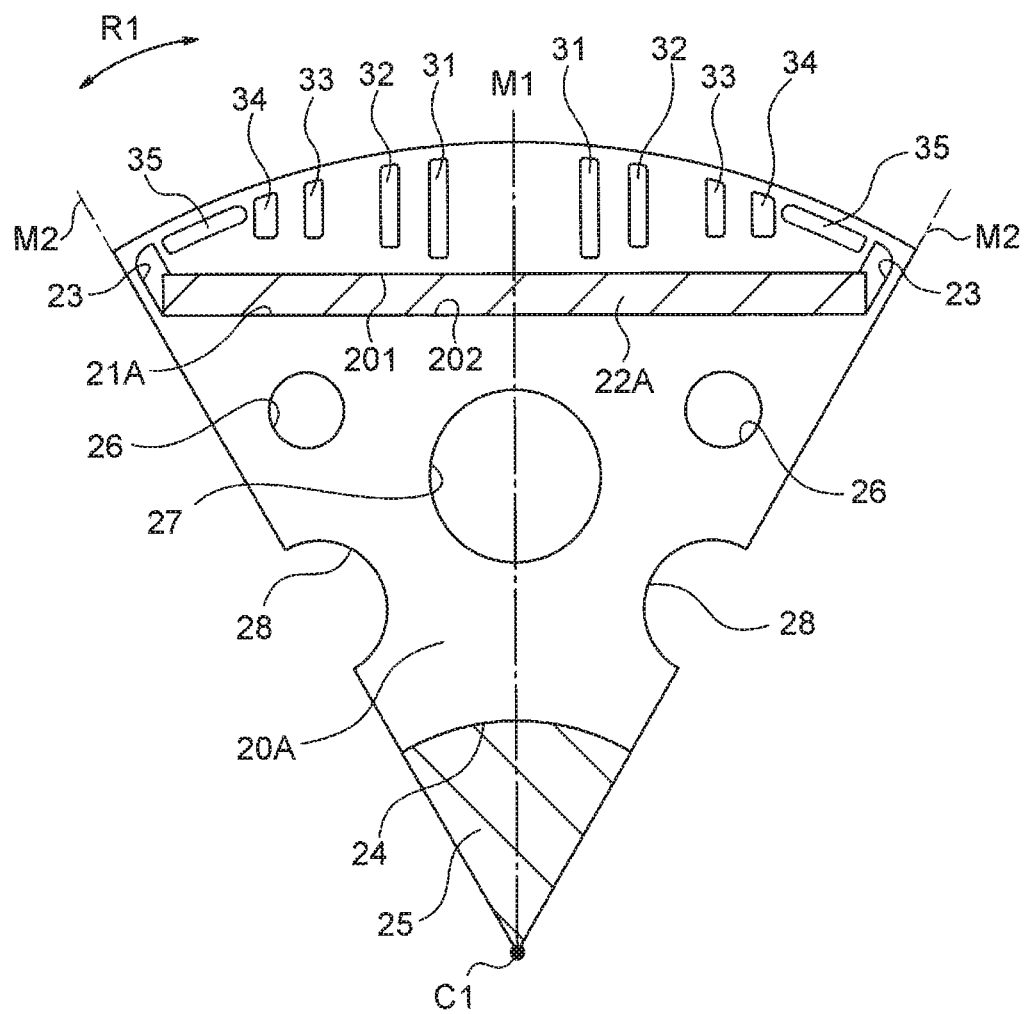
FIG. 5 is a cross-sectional view taken along a line V-V in FIG. 3 as seen in a direction indicated by arrows.

FIG. 5 is a cross-sectional view taken along a line V-V in FIG. 3 as shown in a direction indicated by arrows, i.e., a cross-sectional view of the first core part 20A. The first core part 20A is formed of stack elements which are stacked in the axial direction and fastened by crimping or the like. The stack element is a punched electromagnetic steel sheet having a thickness of, for example, 0.25 to 0.5 mm.

First magnet insertion holes 21A are formed along an outer circumference of the first core part 20A. Each first magnet insertion hole 21A passes through the first core part 20A in the axial direction. In this example, six first magnet insertion holes 21A (see FIG. 1), the number of which is the same as the above described number of magnetic poles of the rotor 2, are formed at equal intervals in the circumferential direction.

The magnetic pole center line M1 described above passes through a center of the first magnet insertion hole 21A in the circumferential direction. The first magnet insertion hole 21A extends linearly in a direction perpendicular to the magnetic pole center line M1. The first magnet insertion hole 21A has an outer end edge 201 which is an end edge on the outer side in the radial direction, and an inner end edge 202 which is an end edge on the inner side in the radial direction.

First permanent magnets 22A are inserted into the first magnet insertion holes 21A. Each first permanent magnet 22A constitutes one magnetic pole. The first permanent magnet 22A is in the form of a flat plate and has a plate surface perpendicular to the magnetic pole center line M1.

The first permanent magnet 22A is magnetized so that the first permanent magnet 22A has different magnetic poles on the outer side and on the inner side in the radial direction of the first core part 20A. Magnetizing directions of the first permanent magnets 22A of the adjacent magnetic poles are opposite to each other.

The first permanent magnet 22A is formed of a rare earth magnet (more specifically, a rare earth sintered magnet) that contains as main components, neodymium (Nd), iron (Fe) and boron (B). A surface of the first permanent magnet 22A is covered with an insulating film. The rare earth magnet has a high residual flux density and a high coercive force, and thus the motor efficiency and demagnetization resistance are enhanced. In order to further enhance the coercive force, dysprosium (Dy) or terbium (Tb) may be added to the rare earth magnet.

A flux barrier 23 is formed on each of both sides of the first magnet insertion hole 21A in the circumferential direction. Each flux barrier 23 is a hole extending in the radial direction from an end of the first magnet insertion hole 21A in the circumferential direction toward the outer circumference of the first core part 20A. The flux barrier 23 is provided to reduce leakage magnetic flux between adjacent magnetic poles (i.e., magnetic flux flowing through the inter-pole portion M2).

In the first core part 20A, a side slit 35 is formed on an inner side of each of the two flux barriers 23 in the circumferential direction. The side slit 35 has a length in the circumferential direction longer than a length in the radial direction and extends along the outer circumference of the first core part 20A.

The side slit 35 serves to increase a magnetic resistance at the flux barrier 23, thereby enhancing the effect of reducing the leakage magnetic flux between the adjacent magnetic poles. Due to the function of reducing the leakage magnetic flux by the side slits 35 and the flux barriers 23, the magnetic flux (effective magnetic flux) interlinking with the teeth 12 of the stator 1 increases, and thus the motor efficiency is enhanced.

The first core part 20A has one or more slits, the number of which is N1 (where N1 is an integer greater than or equal to one), on the outer side of the first magnet insertion hole 21A in the radial direction. In this example, two of each of the slits 31, 32, 33, and 34 are provided so that the slits 31, 32, 33, and 34 are arranged from the center toward each side of the first magnet insertion hole 21A in the circumferential direction. The number N1 of the slits is eight. The number N1 of the slits is not limited to eight, and it is sufficient that the number N1 is one or more. It is noted that the number N1 does not include the number of side slits 35.

Each of the slits 31, 32, 33, and 34 has a shape such that a length in the radial direction is longer than a length in the circumferential direction. The slits 31, 32, 33, and 34 are provided to reduce a torque ripple. In order to enhance the effect of reducing the torque ripple, the slits 31, 32, 33, and 34 are desirably formed symmetrically with respect to the magnetic pole center line M1. The expression "formed symmetrically" means that they are symmetric in terms of shape and arrangement.

The longitudinal directions of the slits 31, 32, 33, and 34 are desirably parallel to the magnetic pole center line M1. By arranging the slits 31, 32, 33, and 34 parallel to the magnetic pole center line M1, the magnetic flux from the first permanent magnet 22A can be guided to the stator 1 at the shortest distance. The longitudinal directions of the slits 31, 32, 33, and 34 may be inclined with respect to the magnetic pole center line M. In such a case, the slits 31, 32, 33 and 34 are desirably inclined symmetrically with respect to the magnetic pole center line M1.

The first core part 20A has first through holes 26, a second through hole 27, and a third through hole 28 on the inner side of each first magnet insertion hole 21A in the radial direction. These through holes 26, 27, and 28 are refrigerant flow passages.

Two first through holes 26 are formed for each magnetic pole so that one first through hole 26 is formed on each of both sides of the magnetic pole center line M1. One second through hole 27 is formed for each magnetic pole, and is located on the inner side with respect to the first through hole 26 in the radial direction and on the magnetic pole center line M1. One third through hole 28 is formed for each magnetic pole, and is located on the inner side with respect to the second through hole 27 in the radial direction and on the inter-pole part M2. All the through holes 26, 27, and 28 are not necessarily provided, and it is sufficient that at least one of the through holes 26, 27, and 28 is provided. In FIG. 1(A) described above, the through holes 26, 27, and 28 are omitted.

FIG. 6 is a cross-sectional view taken along a line VI-VI in FIG. 3 as seen in a direction indicated by arrows, i.e., a cross-sectional view of the second core part 20B. The second core part 20B is formed of stack elements which are stacked in the axial direction and fastened by crimping or the like. The stack element is a punched electromagnetic steel sheet having a thickness of, for example, 0.25 to 0.5 mm.

Second magnet insertion holes 21B are formed along an outer circumference of the second core part 20B. Each second magnet insertion hole 21B passes through the second core part 20B in the axial direction. In this example, six second magnet insertion holes 21B, the number of which is the same as the above described number of magnetic poles of the rotor 2, are formed at equal intervals in the circumferential direction. The first magnet insertion hole 21A (FIG. 5) and the second magnet insertion hole 21B are formed continuously with each other in the axial direction.

The magnetic pole center line M1 described above passes through the center of the second magnet insertion hole 21B in the circumferential direction. The second magnet insertion hole 21B extends linearly in a direction perpendicular to the magnetic pole center line M1. The second magnet insertion hole 21B has an outer end edge 203 which is an end edge on the outer side in the radial direction, and an inner end edge 204 which is an end edge on the inner side in the radial direction.

Second permanent magnets 22B are inserted into the second magnet insertion holes 21B. Each second permanent magnet 22B constitutes one magnetic pole. The second permanent magnet 22B is in the form of a flat plate and has a plate surface perpendicular to the magnetic pole center line M1. The second permanent magnet 22B is magnetized in a similar manner to the first permanent magnet 22A adjacent thereto in the axial direction.

The second permanent magnet 22B is formed of a rare earth magnet (more specifically, a rare earth sintered magnet) that contains as main components, neodymium, iron, and boron, as is the case with the first permanent magnet 22A. The second permanent magnet 22B has a surface covered with an insulating film. In order to further enhance the coercive force, dysprosium or terbium may be added to the rare earth magnet.

A flux barrier 23 is formed on each of both sides of the second magnet insertion hole 21B in the circumferential direction. The flux barrier 23 is continuous to the flux barrier 23 (FIG. 5) of the first core part 20A in the axial direction. The shapes and arrangement of the flux barriers 23 of the second core part 20B are the same as those of the flux barriers 23 (FIG. 5) of the first core part 20A.

A side slit 35 is formed on an inner side of each of the two flux barriers 23 in the circumferential direction. The side slits 35 are continuous to the side slits 35 (FIG. 5) of the first core part 20A in the axial direction. The shapes and arrangement of the side slits 35 of the second core part 20B are the same as those of the side slits 35 (FIG. 5) of the first core part 20A.

The second core part 20B has no, one or more slits, the number of which is N2 (where N2 is an integer greater than or equal to zero and less than N1), on the outer side of the second magnet insertion hole 21B in the radial direction. In this example, the number N2 is zero. That is, in the second core part 20B, no slit is provided on the outer side of the second magnet insertion hole 21B in the radial direction. The number N2 is not limited to zero and may be greater than or equal to one as long as the number N2 is less than the number N1. It is noted that the number N2 does not include the number of side slits 35.

The second core part 20B has first through holes 26, a second through hole 27, and a third through hole 28 on the inner side of each second magnet insertion hole 21B in the radial direction. The first through holes 26 are continuous to the first through holes 26 (FIG. 5) of the first core part 20A in the axial direction. The second through hole 27 is continuous to the second through hole 27 (FIG. 5) of the first core part 20A in the axial direction. The third through hole 28 is continuous to the third through hole 28 (FIG. 5) of the first core part 20A in the axial direction.

With reference to FIG. 4 again, the first magnet insertion hole 21A and the second magnet insertion hole 21B are continuous to each other in the axis direction. A width W1 of the first magnet insertion hole 21A in the radial direction is wider than a width W2 of the second magnet insertion hole 21B in the radial direction. A width of the first permanent magnet 22A in the radial direction is wider than a width of the second permanent magnet 22B in the radial direction.

The outer end edges 201 and 203 of the magnet insertion holes 21A and 21B are located at the same position in the radial direction. Meanwhile, the inner end edge 202 of the first magnet insertion hole 21A is located on the inner side in the radial direction with respect to the inner end edge 202 of the second magnet insertion hole 21B. The magnet insertion holes 21A and 21B are not limited to such a configuration. Alternatively, the inner end edges 202 and 204 may be located at the same position in the radial direction, while the outer end edge 201 may be located on the inner side in the radial direction with respect to the outer end edge 203.

The rotor core 20 is formed by stacking, in the axial direction, a plurality of electromagnetic steel sheets each of which is punched into the shape of the first core part 20A shown in FIG. 5 and a plurality of electromagnetic steel sheets each of which is punched into the shape of the second core part 20B shown in FIG. 6. The positions in the circumferential direction of both ends of the first magnet insertion hole 21A (FIG. 5) in the circumferential direction are the same as the positions in the circumferential direction of both ends of the second magnet insertion hole 21B (FIG. 6) in the circumferential direction.

In the rotor core 20, the first core part 20A having the wider first magnet insertion holes 21A is disposed on each of both sides in the axial direction of the second core part 20B having the narrower second magnet insertion holes 21B. Thus, the second permanent magnet 22B can be inserted into the second magnet insertion hole 21B from one side of the rotor core 20 in the axial direction, and then the first permanent magnets 22A can be inserted into the first magnet insertion holes 21A from both sides of the rotor core 20 in the axial direction.

As described above, since the outer end edges 201 and 203 of the magnet insertion holes 21A and 21B are located at the same position in the radial direction, the permanent magnets 22A and 22B which are inserted are guided by the outer end edges 201 and 203. Thus, the permanent magnets 22A and 22B can be easily inserted into the magnetic insertion holes 21A and 21B.

(Operation)

Next, an operation of the motor 100 of the first embodiment will be described. Each of the permanent magnets 22A and 22B is formed of a rare earth magnet and thus has electrical conductivity. A magnetic flux (i.e., stator magnetic flux) generated in the winding 15 of the stator 1 passes through the permanent magnets 22A and 22B. An eddy current flows in the permanent magnet 22A in accordance with a change over time (dΦ/dt) in the stator magnetic flux Φ passing through the permanent magnet 22A, and an eddy current flows in the permanent magnet 22B in accordance with a change over time (dΦ/dt) in the stator magnetic flux Φ passing through the permanent magnet 22B. The eddy current causes a loss (i.e., eddy current loss), and results in reduction in the motor efficiency. Furthermore, temperatures of the permanent magnets 22A and 22B increase due to Joule heat, which causes high-temperature demagnetization of the permanent magnets 22B and 22B.

In general, as the number of slits on the outer side of the magnetic insertion hole in the radial direction increases, the stator magnetic flux is more likely to concentrate on a region between the slit and the magnet insertion hole (that is, the magnetic flux density increases). Thus, an inductive electromotive force is generated in the permanent magnet due to fluctuations in the magnetic flux, and the eddy current is more likely to flow in the permanent magnet. In the first embodiment, the eddy current loss is reduced by decreasing the number N2 of the slits on the outer side of the second magnet insertion hole 21B of the second core part 20B in the radial direction.

Meanwhile, when the number of slits on the outer side of the magnet insertion hole in the radial direction is small, the eddy current loss is reduced, but a torque ripple (torque pulsation) increases, which causes noise and vibration of the motor 100. In the first embodiment, since the first core part 20A has the slits 31 to 34, the number of which is N1 (>N2), on the outer side of the first magnet insertion hole 21A in the radial direction, the torque ripple can be reduced, and the noise and vibration of the motor 100 can be reduced.

As the number of slits on the outer side of the magnetic insertion hole in the radial direction increases, the stator magnetic flux is more likely to be guided to the permanent magnet along the slits, and thus demagnetization of the permanent magnet is more likely to occur. In the first embodiment, since the number N1 of the slits 31 to 34 in the first core part 20A is greater than the number N2 of the slits in the second core part 20B, the second permanent magnet 22B is less likely to be demagnetized (i.e., has higher demagnetization resistance) than the first permanent magnet 22A.

In this regard, the demagnetization resistance of the entire rotor 2 is identical to a lower one of the demagnetization resistances of the first permanent magnet 22A and the second permanent magnet 22B. Thus, in order to enhance the demagnetization resistance of the entire rotor 2, it is necessary to enhance the demagnetization resistance of the first permanent magnet 22A.

For this reason, in the first embodiment, the width W1 of the first magnet insertion hole 21A is wider than the width W2 of the second magnet insertion hole 21B (W1>W2). Thus, the width of the first permanent magnet 22A inserted into the first magnet insertion hole 21A is wider than the width of the second permanent magnet 22B inserted into the second magnet insertion hole 21B. Consequently, the concentration of the stator magnetic flux in the first permanent magnet 22A is relieved, and thereby the demagnetization of the first permanent magnet 22A is less likely to occur. That is, the demagnetization resistance of the first permanent magnet 22A can be made closer to that of the second permanent magnet 22B.

As the first core part 20A and the second core part 20B are combined in this way, the eddy current loss can be reduced without increasing the torque ripple and without reducing the demagnetization resistance. Since the eddy current loss is reduced, the motor efficiency can be enhanced. Further, since heat generation in the permanent magnets 22A and 22B is suppressed, the high-temperature demagnetization can be prevented.

Since the second permanent magnets 22B can be formed to be thinner than the first permanent magnet 22A, the material cost can be reduced, and the manufacturing cost of the motor 100 can be reduced. In addition, the leakage magnetic flux which may occur in a case where the permanent magnet is divided in the circumferential direction is less likely to occur, and thus the reduction of the magnetic force can be suppressed.

Next, a ratio of a length of the second core part 20B in the axial direction to that of the rotor core 20 will be described. The ratio of the length of the second core part 20B in the axial direction to that of the rotor core 20 is a ratio (%) of the length L2 of the second core part 20B in the axial direction to a length (L1×2+L2) of the rotor core 20 in the axial direction, and is expressed as L2/(L1×2+L2)×100.

The ratio of the length of the second core part 20B in the axial direction to that of the rotor core 20 may be considered to be a ratio of a volume of the second core part 20B to a volume of the rotor core 20, or a ratio of a weight of the second core part 20B to a weight of the rotor core 20.

Figure 7:
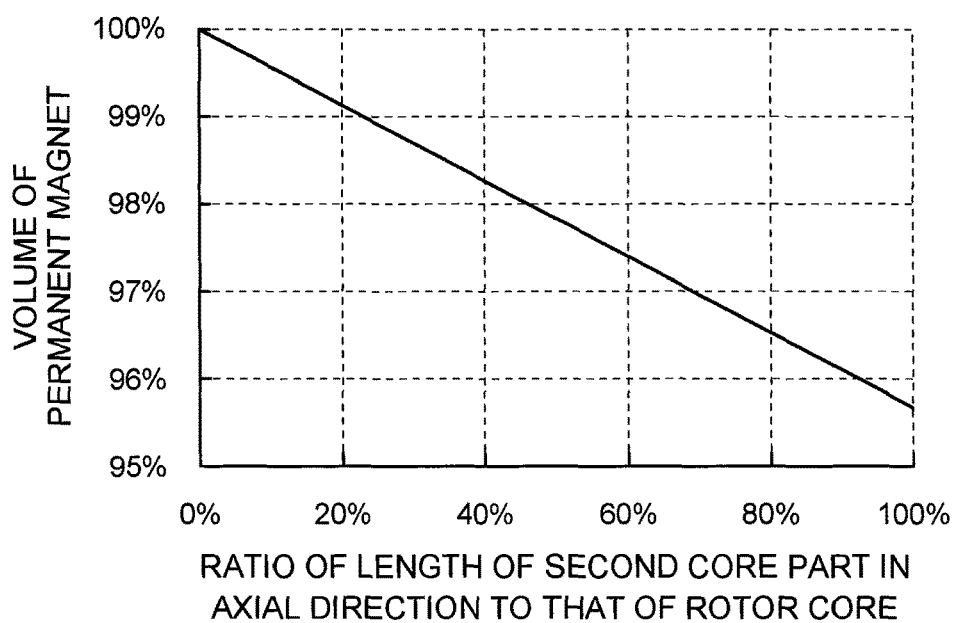
FIG. 7 is a graph showing a relationship between a ratio of a length of a second core part in an axial direction to that of a rotor core and a volume of a permanent magnet.

FIG. 7 is a graph showing a relationship between the ratio of the length of the second core part 20B in the axial direction to that of the rotor core 20 and a total volume of the permanent magnets 22A and 22B. A reference value (100%) of the total volume of the permanent magnets 22A and 22B is defined by the total volume of the permanent magnets 22A and 22B obtained when the ratio of the length of the second core part 20B in the axial direction to that of the rotor core 20 is zero, that is, when the rotor core 20 is formed of only the first core part 20A. The total volume of the permanent magnets 22A and 22B is represented as a relative value to this reference value.

From FIG. 7, it is understood that as the ratio of the length of the second core part 20B in the axial direction to that of the rotor core 20 increases, the total volume of the permanent magnets 22A and 22B decreases. This is because the width W2 of the second magnet insertion hole 21B in the second core part 20B is narrower than the width W1 of the first magnet insertion hole 21A in the first core part 20A.

Figure 8:
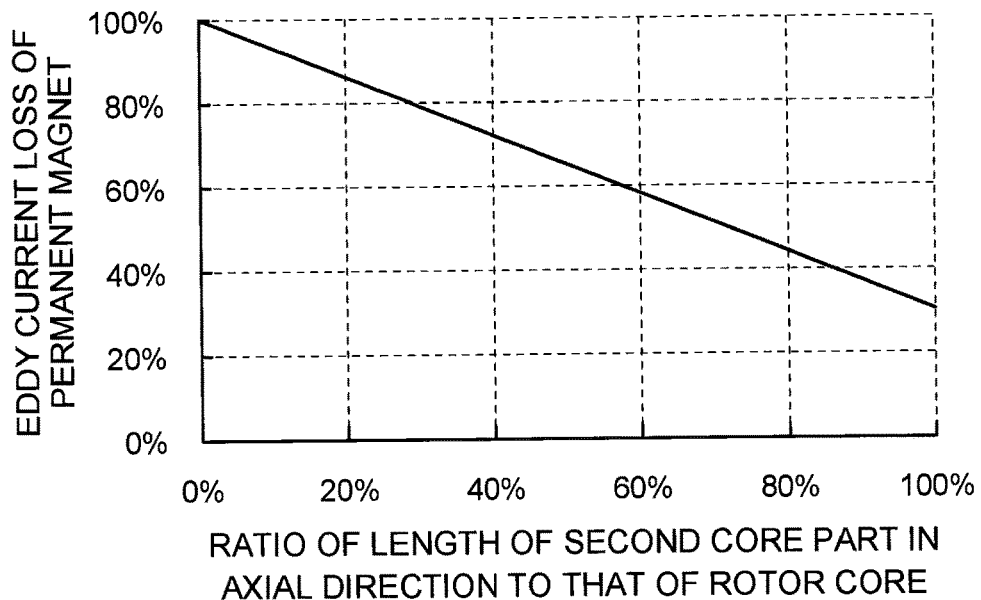
FIG. 8 is a graph showing a relationship between the ratio of the length of the second core part in the axial direction to that of the rotor core and an eddy current loss in the permanent magnet.

FIG. 8 is a graph showing a relationship between the ratio of the length of the second core part 20B in the axial direction to that of the rotor core 20 and an eddy current loss. A reference value (100%) of the eddy current loss is defined by an eddy current loss caused when the ratio of the length of the second core part 20B in the axial direction to that of the rotor core 20 is zero, that is, when the rotor core 20 is formed of only the first core part 20A. The eddy current loss is represented as a relative value to this reference value.

From FIG. 8, it is understood that as the ratio of the length of the second core part 20B in the axial direction to that of the rotor core 20 increases, the eddy current loss decreases. In particular, when the ratio of the length of the second core part 20B in the axial direction to that of the rotor core 20 is greater than or equal to 70%, it is understood that the eddy current loss is reduced to 50% or less of the eddy current loss caused when the rotor core 20 is formed of only the first core part 20A.

This reduction effect (50%) of the eddy current loss is generally equivalent to that obtained by dividing the permanent magnet into two parts in the circumferential direction. That is, it is understood that the same effect as that obtained by dividing the permanent magnet into two parts in the circumferential direction can be obtained by using the rotor core 20 in which the first core part 20A and the second core part 20B are combined in the axial direction and setting the ratio of the length of the second core part 20B in the axial direction to that of the rotor core 20 to be greater than or equal to 70%.

When the permanent magnet is divided into two parts in the circumferential direction, the eddy current loss is reduced, but a leakage magnetic flux is generated between the permanent magnet parts divided in the circumferential direction. When the leakage magnetic flux is generated, a torque constant (i.e., a constant K in the expression $T=K \times I$, where T denotes a generated torque, and I denotes a current) decreases. In the first embodiment, it is not necessary to divide the permanent magnet in the circumferential direction, and thus the reduction of the toque constant due to the leakage magnetic flux can be suppressed. In other words, it is possible to suppress the reduction of the magnetic force due to the leakage magnetic flux that occurs in a case where the permanent magnet is divided into two parts in the circumferential direction.

An upper limit of the ratio of the length of the second core part 20B in the axial direction to that of the rotor core 20 is a value when the first core part 20A is formed of only one electromagnetic steel sheet. Thus, the ratio of the length of the second core part 20B in the axial direction to that of the rotor core 20 is greater than or equal to 70% and less than 100%.

Figure 9:
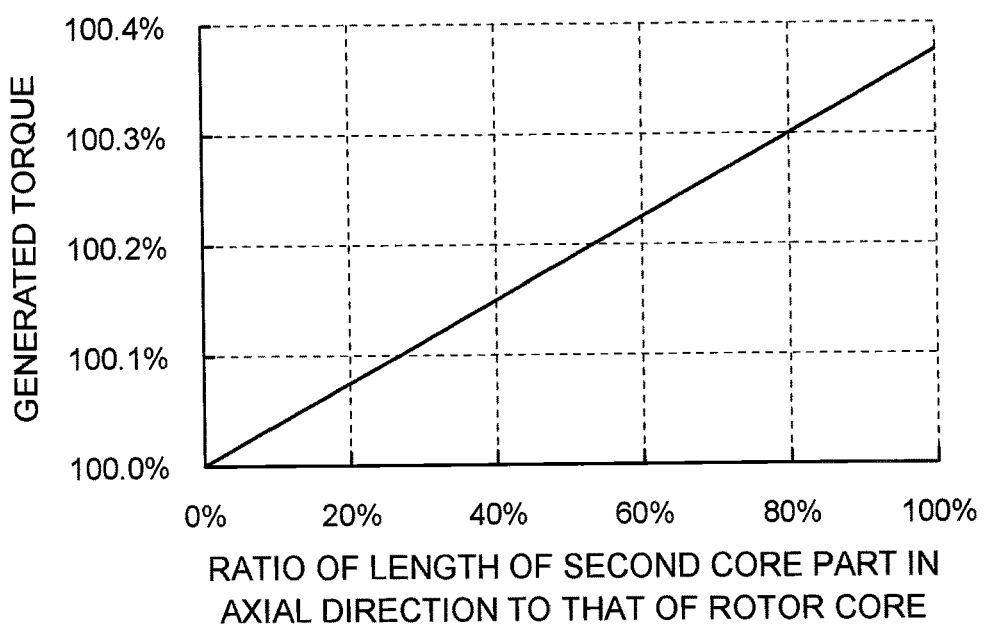
FIG. 9 is a graph showing a relationship between a ratio of the length of the second core part in the axial direction to that of the rotor core and a generated torque.

FIG. 9 is a graph showing a relationship between the ratio of the length of the second core part 20B in the axial direction to that of the rotor core 20 and a generated torque. A reference value (100%) of the generated torque is defined by a torque generated when the ratio of the length of the second core part 20B in the axial direction to that of the rotor core 20 is zero, that is, when the rotor core 20 is formed of only the first core part 20A. The generated torque is represented as a relative value to this reference value.

From FIG. 9, it is understood that as the ratio of the length of the second core part 20B in the axial direction to that of the rotor core 20 increases, the generated torque increases. This is because of the following reason. Since the number N2 of slits in the second core part 20B is small (specifically, zero), there is few obstacle that interrupts the magnetic flux from the second permanent magnet 22B to the stator 1, and thus the magnetic flux (effective magnetic flux) interlinking with the teeth 12 increases.

Figure 10:
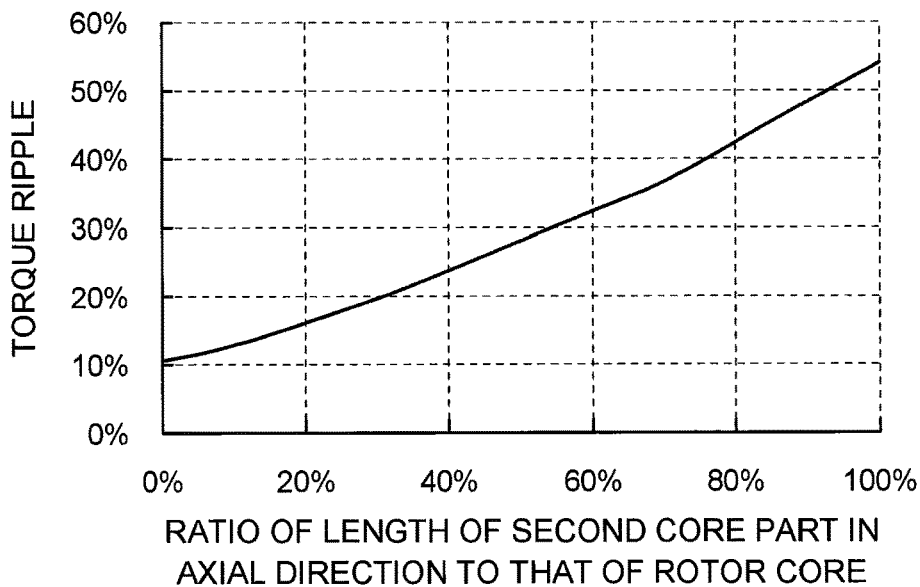
FIG. 10 is a graph showing a relationship between the ratio of the length of the second core part in the axial direction to that of the rotor core and a torque ripple.

FIG. 10 is a graph showing a relationship between the ratio of the length of the second core part 20B in the axial direction to that of the rotor core 20 and a torque ripple. The torque ripple is defined by $(T_{max}-T_{min})/T_{ave} \times 100$, based on a maximum torque value $T_{min}$, a minimum torque value $T_{min}$, and an average torque value $T_{ave}$ in one cycle of electrical angle. For example, the expression "torque ripple of 100%" means that a difference $(T_{max}-T_{min})$ between the maximum torque value and the minimum torque value is equal to the average torque value $T_{ave}$.

From FIG. 10, it is understood that as the ratio of the length of the second core part 20B in the axial direction to that of the rotor core 20 increases, the torque ripple also increases. This is because an increase in the ratio of the length of the second core part 20B in the axial direction to that of the rotor core 20 causes a decrease in the ratio of the length in the axial direction of the first core part 20A including the slits 31 to 34 for reducing the torque ripple to that of the rotor core 20.

The torque ripple reaches a maximum value (55%) when the ratio of the length of the second core part 20B in the axial direction to that of the rotor core 20 is 100%, that is, when the rotor core 20 is formed of only the second core part 20B. When the ratio of the length of the second core part 20B in the axial direction to that of the rotor core 20 is 90%, the torque ripple decreases by 10% with respect to the maximum value (i.e., by 5% on the vertical scale in FIG. 10). A decrease in the torque ripple of 10% corresponds to the reduction in noise of 1 dB. Thus, in order to obtain the effect of reducing the noise by 1 dB, the ratio of the length of the second core part 20B in the axial direction to that of the rotor core 20 is desirably less than or equal to 90%.

Effects of Embodiment

As described above, in the rotor 2 of the first embodiment, the rotor core 20 includes the first core part 20A having the first magnet insertion holes 21A and the second core part 20B having the second magnet insertion holes 21B. The permanent magnets 22A and 22B formed of rare earth magnets are disposed in the magnet insertion holes 21A and 21B, respectively. The width W1 of the first magnet insertion hole 21A in the radial direction is wider than the width W2 of the second magnet insertion hole 21B in the radial direction. The first core part 20A has the slits 31 to 34, the number of which is N1 ($1 \leq N1$), on the outer side of the first magnet insertion hole 21A in the radial direction, and the slits are elongated in the radial direction. The second core part 20B has the slits, the number of which is N2 ($0 \leq N2 < N1$), on the outer side of the second magnet insertion hole 21B in the radial direction, and the slits are elongated in the radial direction. The ratio of the length of the second core part 20B in the axial direction to that of the rotor core 20 is greater than or equal to 70% and less than 100%.

Since the number N2 of the slits in the second core part 20B is smaller than the number N1 of the slits in the first core part 20A, and the ratio of the length of the second core part 20B in the axial direction to that of the rotor core 20 is greater than or equal to 70% and less than 100%, the eddy current loss can be reduced. Since the width W1 of the first magnet insertion hole 21A is wider than the width W2 of the second magnet insertion hole 21B, the demagnetization resistances of the first permanent magnets 22A and 22B can be made closer to each other. Further, the second permanent magnet 22B can be formed to be thinner than the first permanent magnet 22A, and thus the manufacturing cost can be reduced. Moreover, the leakage magnetic flux that occurs when the permanent magnet is divided in the circumferential direction is less likely to occur, and thus the reduction of the magnetic force can be suppressed.

By setting the ratio of the length of the second core part 20B in the axial direction to that of the rotor core 20 to be less than or equal to 90%, noise caused by the torque ripple can be reduced.

There is provided two first core part 20A, one on each of both sides of the second core part 20B in the axial direction. Thus, the permanent magnets 22A and 22B are easily inserted into the magnet insertion holes 21A and 21B, and the weight balance of the rotor 2 in the axial direction is enhanced.

The first magnet insertion hole 21A and the second magnet insertion hole 21B are continuous to each other in the axial direction. Thus, the second permanent magnet 22B can be inserted into the second magnet insertion hole 21B through the first magnet insertion hole 21A, and thus an inserting operation is facilitated.

In addition, since the outer end edges 201 and 203 (or inner end edges 202 and 204) of the first magnet insertion hole 21A and the second magnet insertion hole 21B are located at the same position in the radial direction, the permanent magnets 22A and 22B are guided by the outer end edges 201 and 203 (or inner end edges 202 and 204) during insertion, and thus the inserting operation is further facilitated.

Since the plurality of slits 31, 32, 33, and 34 in the first core part 20A are formed symmetrically with respect to the magnetic pole center line M1, spatial harmonics of the magnetic flux generated in the air gap can be suppressed, and the torque ripple and an excitation force in the radial direction (a force with which the rotor core 20 is attracted by a stator magnetic field) can also be suppressed.

Further, the first core part 20A has the side slit 35 on each of both ends of the first magnet insertion hole 21A in the circumferential direction, while the second core part 20B has the side slit 35 on each of both ends of the second magnet insertion hole 21B in the circumferential direction. Thus, the leakage magnetic flux between the adjacent magnetic poles can be reduced.

The magnet insertion holes 21A and 21B extend linearly and perpendicularly to the magnetic pole center line M1, and thus core portions on the outer side of the magnet insertion holes 21A and 21B in the radial direction can be made smaller. Consequently, a centrifugal force applied to the core portions on the outer side of the magnet insertion holes 21A and 21B in the radial direction can be reduced, and thus the durability of the rotor core 20 can be enhanced.

The through holes 26, 27, and 28 are provided to pass through the rotor core 20 in the axial direction, and thus the rotor 2 can be cooled by refrigerant flowing through the through holes 26, 27, and 28. Thus, the high-temperature demagnetization of the permanent magnet 22A and 22B can be suppressed.

The cutout portions 16 are provided on the outer circumference of the stator core 10, and thus the motor 100 can be cooled by the refrigerant flowing through between the cutout portions 16 and the shell 5.

Since the winding 15 of the stator 1 includes the conductor 15a made of copper or aluminum and the insulating film 15b covering the surface of the conductor 15a, corrosion of the winding 15 can be prevented, for example, in the refrigerant of the compressor 500.

First Modification

Figure 11:
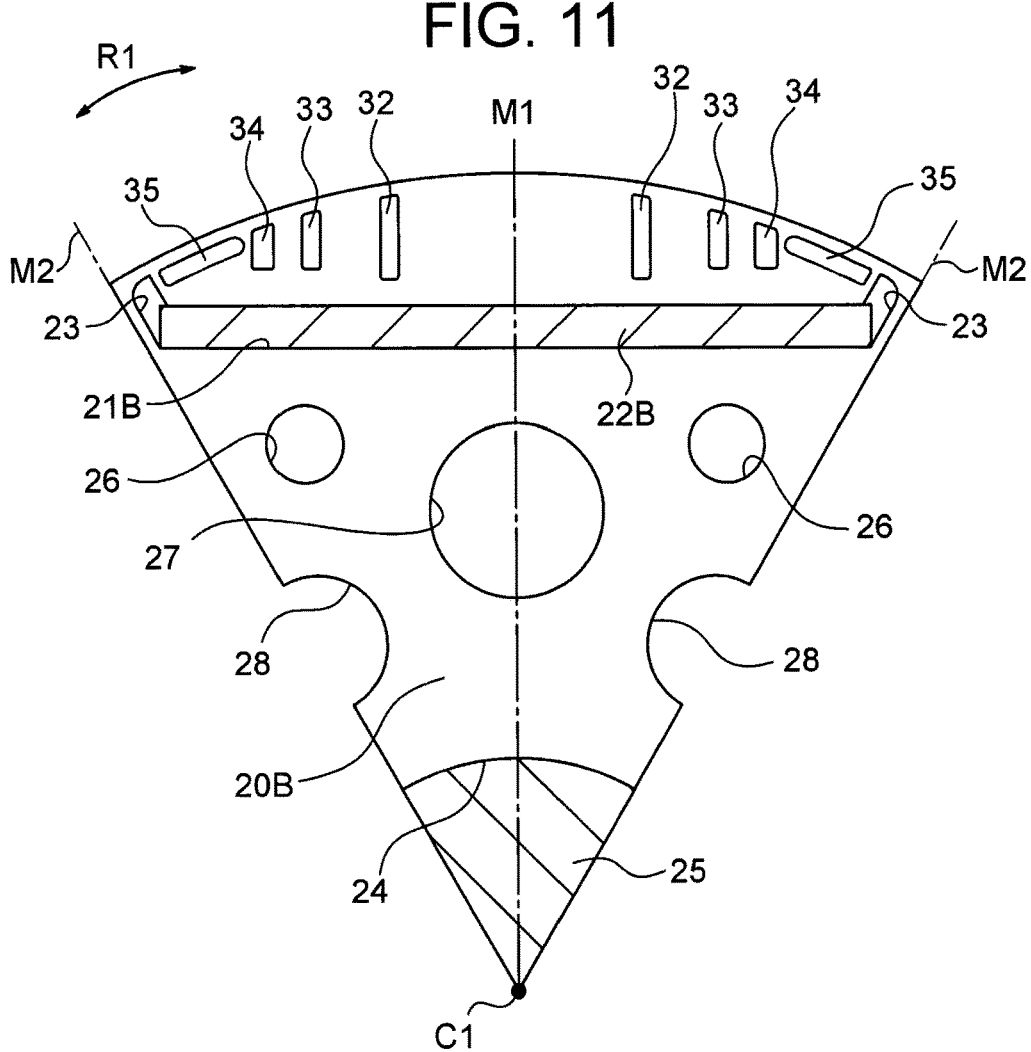
FIG. 11 is a cross-sectional view of a second core part of a rotor of a first modification of the first embodiment.

FIG. 11 is a cross-sectional view of a second core part 20B of a rotor 2 of a first modification of the first embodiment. In the second core part 20B of the first modification, two of each of the slits 32, 33, and 34 are arranged on the outer side of each second magnet insertion hole 21B in the radial direction. That is, the number N2 of slits is six. The number N1 of slits for each first magnet insertion hole 21A in the first core part 20A is eight as described above, and thus N1>N2 is satisfied.

The shapes and arrangement of the slits 32, 33, and 34 in the second core part 20B are the same as, for example, those of the slits 32, 33, and 34 among the eight slits 31, 32, 33, and 34 in the first core part 20A. However, the slits are not limited to such a configuration and it is sufficient that six slits are provided on the outer side of each second magnet insertion hole 21B in the radial direction.

The slits 32, 33, and 34 in the second core part 20B are desirably formed symmetrically with respect to the magnetic pole center line M1. With this arrangement, spatial harmonics of the magnetic flux generated in the air gap is suppressed, and thus the torque ripple and the excitation force in the radial direction can be reduced. The longitudinal directions of the slits 32, 33, and in the second core part 20B are desirably parallel to the magnetic pole center line M1. With this arrangement, the magnetic flux from the second permanent magnet 22B can be guided to the stator 1 by the shortest distance.

Also in the first modification, the ratio of the length of the second core part 20B in the axial direction to that of the rotor core 20 is greater than or equal to 70% and less than 100%. The width W1 of the first magnet insertion hole 21A in the first core part 20A is wider than the width W2 of the second magnet insertion hole 21B in the second core part 20B.

The rotor 2 of the first modification has the same configuration as the rotor 2 of the first embodiment except that the second core part 20B has the slits 32, 33, and 34 on the outer side of the magnet insertion hole 21B in the radial direction.

Second Modification

Figure 12:
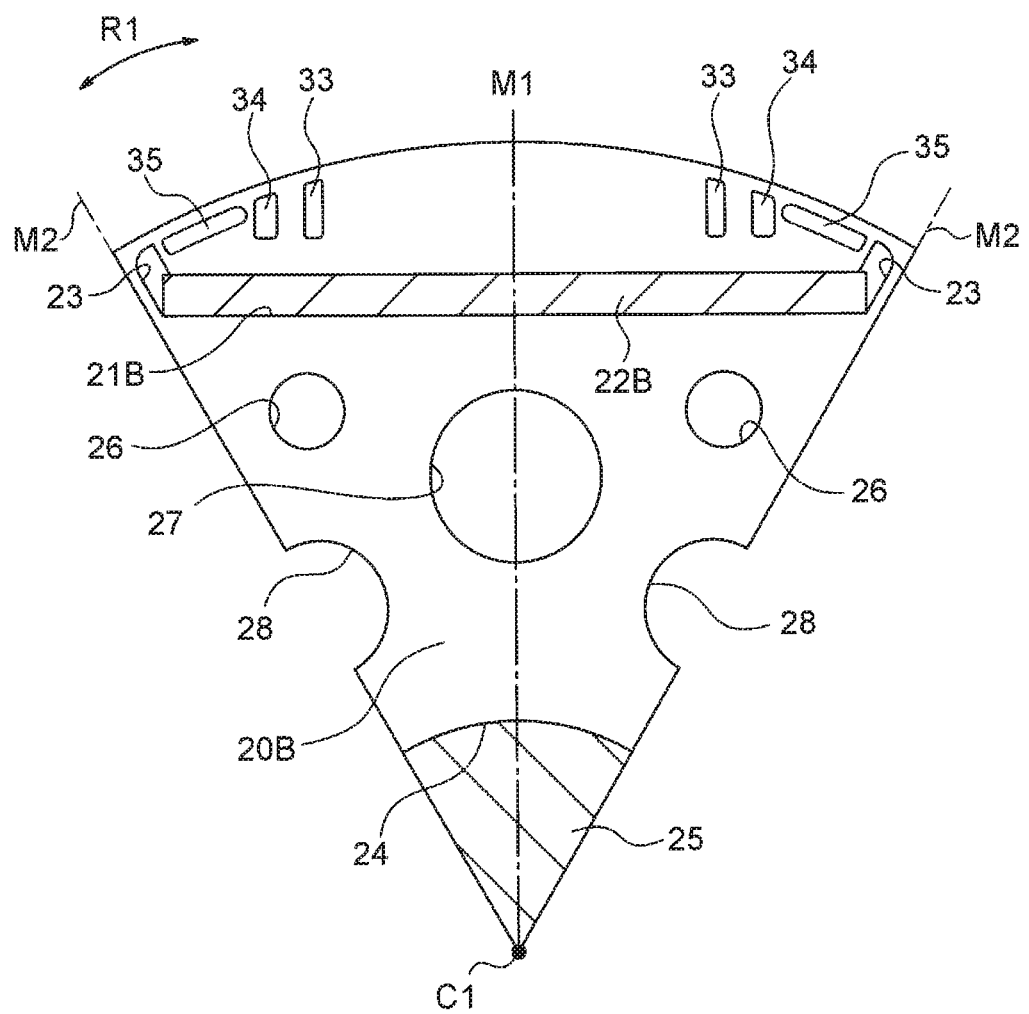
FIG. 12 is a cross-sectional view of a second core part of a rotor of a second modification of the first embodiment.

FIG. 12 is a cross-sectional view of a second core part 20B of a rotor 2 of a second modification of the first embodiment. In the second core part 20B of the second modification, two of each of the slits 33 and 34 are formed on the outer side of each second magnet insertion hole 21B in the radial direction. That is, the number N2 of slits is four. The number of slits N1 for each first magnet insertion hole 21A in the first core part 20A is eight as described above, and thus N1>N2 is satisfied.

The shapes and arrangement of the slits 33 and 34 in the second core part 20B are the same as, for example, those of the slits 33 and 34 among the eight slits 31, 32, 33, and 34 in the first core part 20A. However, the slits are not limited to such a configuration and it is sufficient that four slits are provided on the outer side of each second magnet insertion hole 21B in the radial direction.

The slits 33 and 34 in the second core part 20B are desirably formed symmetrically with respect to the magnetic pole center line M1. The longitudinal directions of the slits 33 and 34 in the second core part 20B are desirably parallel to the magnetic pole center line M1.

Also in the second modification, the ratio of the length of the second core part 20B in the axial direction to that of the rotor core 20 is greater than or equal to 70% and less than 100%. The width W1 of the first magnet insertion hole 21A in the first core part 20A is wider than the width W2 of the second magnet insertion hole 21B in the second core part 20B.

The rotor 2 of the second modification has the same configuration as the rotor 2 of the first embodiment except that the second core part 20B has the slits 33 and 34 on the outer side of the second magnet insertion hole 21B in the radial direction.

Third Modification

Figure 13:
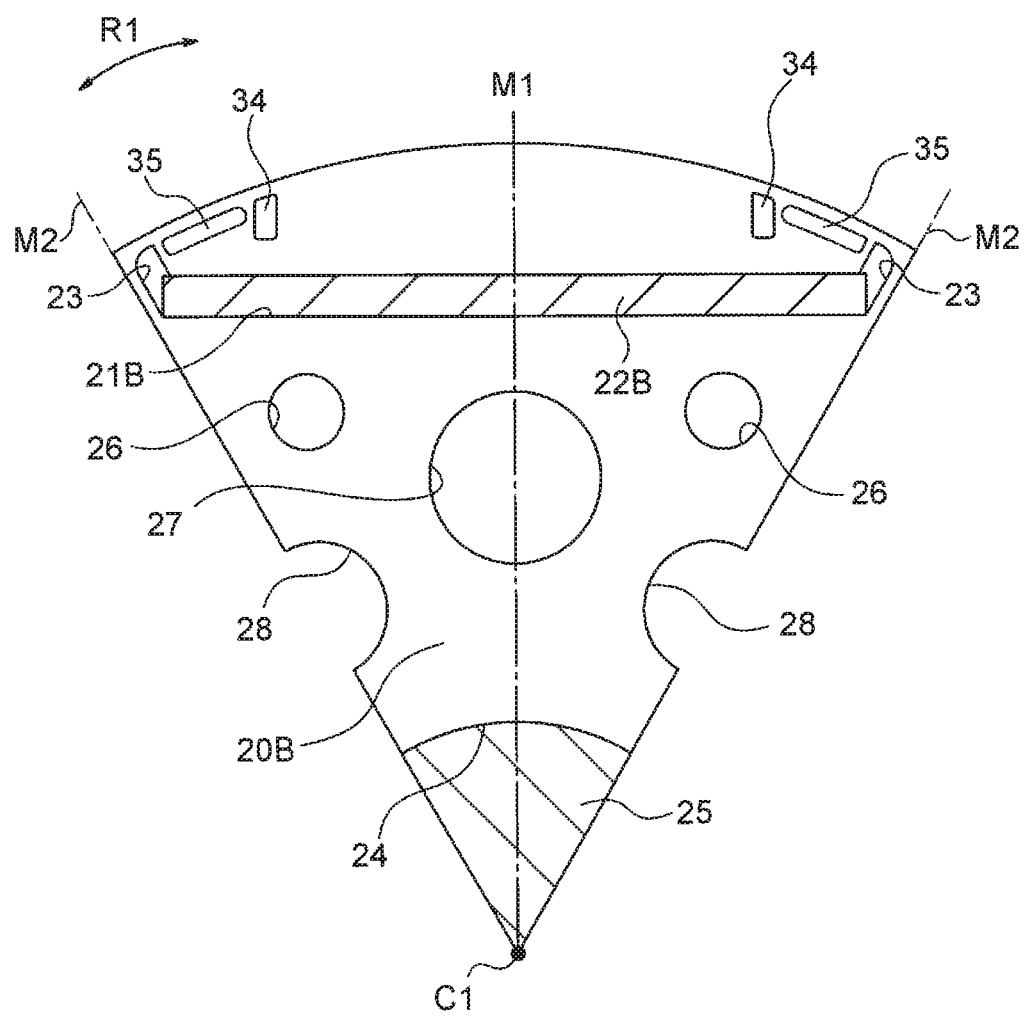
FIG. 13 is a cross-sectional view of a second core part of a rotor of a third modification of the first embodiment.

FIG. 13 is a cross-sectional view of a second core part 20B of a rotor 2 of a third modification of the first embodiment. In the second core part 20B of the third modification, two slits 34 are formed on the outer side of each second magnet insertion hole 21B in the radial direction. That is, the number N2 of slits is two. The number of slits N1 for each first magnet insertion hole 21A in the first core part 20A is eight as described above, and thus N1>N2 is satisfied.

The shapes and arrangement of the slits 34 in the second core part 20B are the same as, for example, those of the slits 34 among the eight slits 31, 32, 33, and 34 in the first core part 20A. However, the slits are not limited to such a configuration and it is sufficient that two slits are provided on the outer side of the second magnet insertion hole 21B in the radial direction.

The slits 34 in the second core part 20B are desirably formed symmetrically with respect to the magnetic pole center line M1. The longitudinal direction of the slit 34 in the second core part 20B is desirably parallel to the magnetic pole center line M1.

Also in the third modification, the ratio of the length of the second core part 20B in the axial direction to that of the rotor core 20 is greater than or equal to 70% and less than 100%. The width W1 of the first magnet insertion hole 21A in the first core part 20A is wider than the width W2 of the second magnet insertion hole 21B in the second core part 20B.

The rotor 2 of the third modification has the same configuration as the rotor 2 of the first embodiment except that the second core part 20B has the slits 34 on the outer side of the second magnet insertion hole 21B in the radial direction.

In the first to third modifications (FIGS. 11 to 13), the second core part 20B has the slits on the outer side of the second magnet insertion hole 21B in the radial direction, but the number N2 of these slits is smaller than the number N1 of slits in the first core part 20A (N2<N1). Thus, the eddy current loss in the permanent magnets 22A and 22B can be reduced. Since the widths W1 and W2 of the magnet insertion holes 21A and 21B satisfy W1>W2, the demagnetization resistances of the first permanent magnets 22A and 22B can be made closer to each other.

The second core part 20B has the slits on the outer side of the second magnet insertion hole 21B in the radial direction, and thus the effect of reducing the torque ripple can be enhanced as compared to the first embodiment.

Second Embodiment

Figure 14:
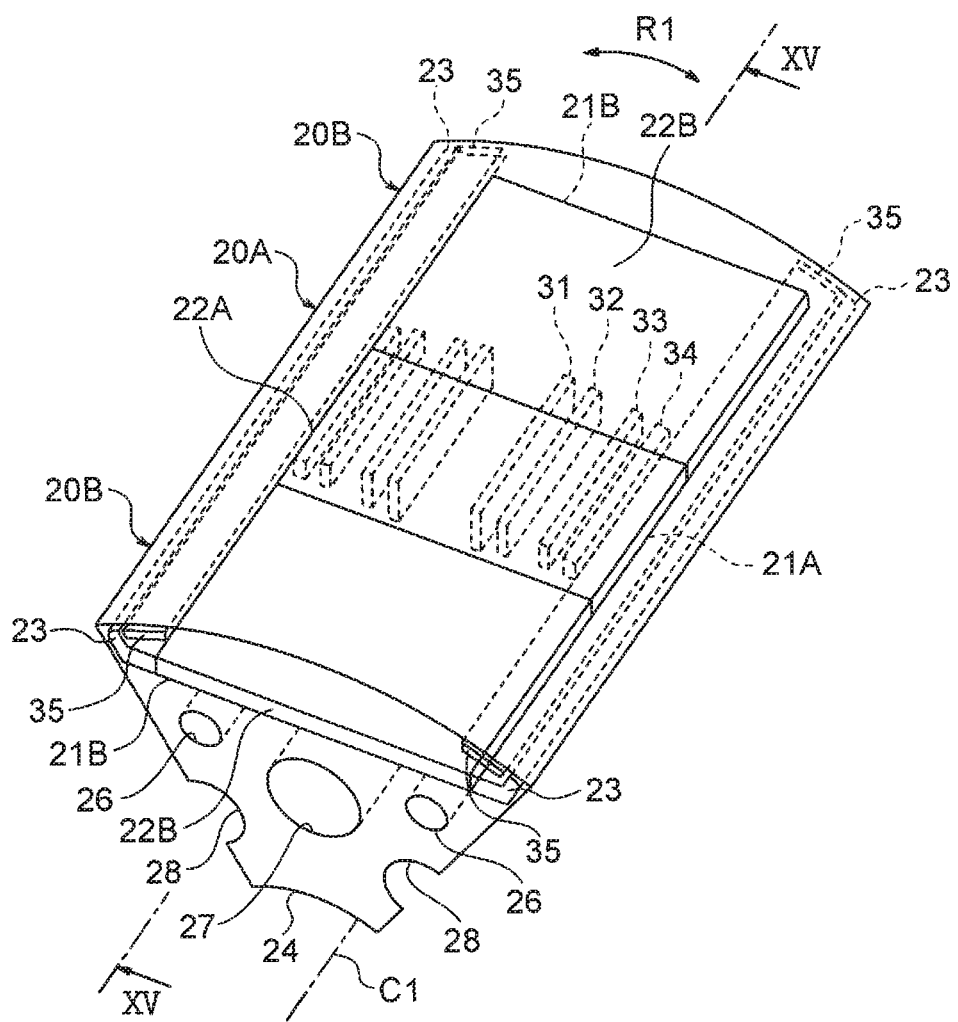
FIG. 14 is a perspective view schematically showing a portion corresponding to one magnetic pole of a rotor of a second embodiment.
Figure 15:
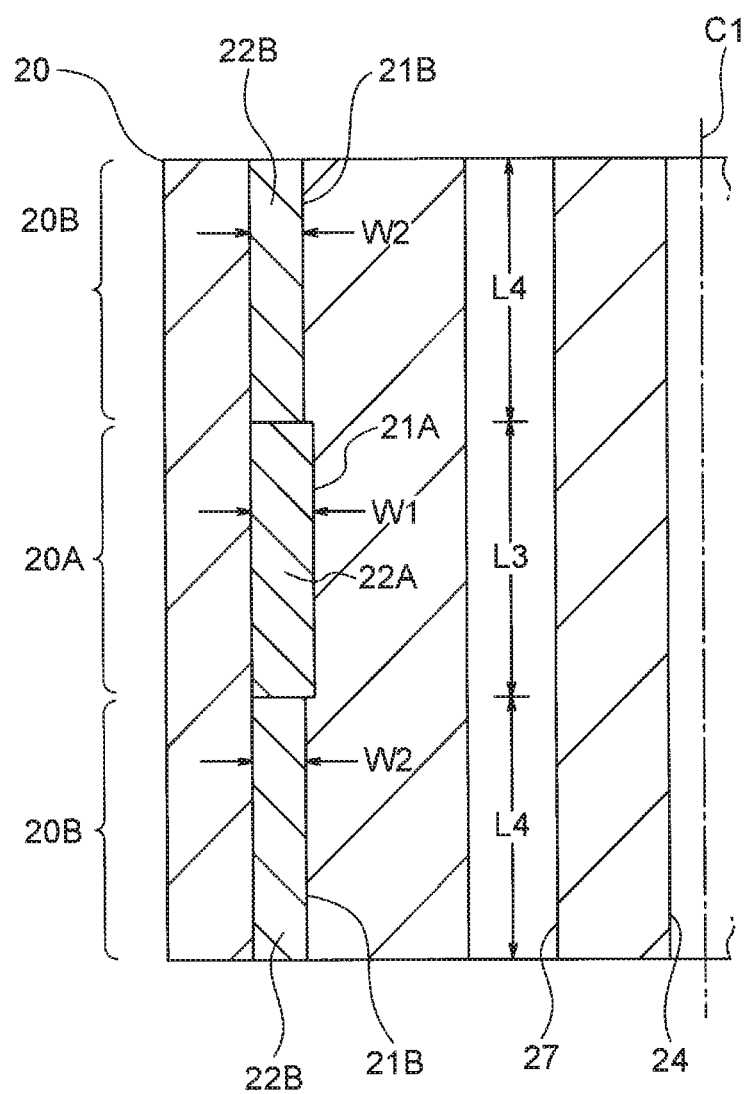
FIG. 15 is a longitudinal sectional view showing the rotor of the second embodiment.

Next, a second embodiment of the present invention will be described. FIG. 14 is a perspective view showing a portion corresponding to one magnetic pole of a rotor 2 in a motor of a second embodiment. FIG. 15 is a cross-sectional view taken along a line XV-XV in FIG. 14 as seen in a direction indicated by arrows, i.e., a longitudinal sectional view of the rotor 2.

In the above-described first embodiment, two first core parts 20A are provided, one on each of both sides of the second core part 20B in the axial direction. In contrast, in the second embodiment, two second core parts 20B are provided, one on each of both sides of the first core part 20A in the axial direction.

The first core part 20A has the same configuration as the first core part 20A (FIG. 5) of the first embodiment and is disposed at the center of the rotor core 20 in the axial direction. The second core part 20B has the same configuration as the second core part 20B (FIG. 6) of the first embodiment and is disposed on each of both ends of the rotor core 2 in the axial direction.

As shown in FIG. 15, the first core part 20A has a length L3 in the axial direction, while each second core part 20B has a length L4 in the axial direction. The width W1 of the first magnet insertion hole 21A is wider than the width W2 of the second magnet insertion hole 21B. The ratio of the length of the second core part 20B in the axial direction to that of the rotor core 20 is expressed as L4×2/(L3+L4×2)× 100. The ratio is greater than or equal to 70% and less than 100%.

Although the second core part 20B has no slit on the outer side of the second magnet insertion hole 21B in the radial direction, the second core part 20B may have slits, the number of which is N2 (<N1), on the outer side of the second magnet insertion hole 21B in the radial direction as described in the modifications (FIGS. 11 to 13).

In the second embodiment, the second magnet insertion hole 21B having the narrower width W2 is located on each of both sides of the first magnet insertion hole 21A having the wider width W1 in the axial direction. For this reason, it is necessary to insert the first permanent magnet 22A into the first magnet insertion hole 21A before the rotor core 20 is completed.

Thus, the first permanent magnet 22A is inserted into the first magnet insertion hole 21A at the stage when the first core part 20A is formed by stacking the electromagnetic steel sheets. Thereafter, electromagnetic steel sheets are stacked on both sides of the first core part 20A in the axial direction to form the second core parts 20B, and then the second permanent magnets 22B are inserted into the second magnet insertion holes 21B.

The rotor 2 of the second modification has the same configuration as the rotor 2 of the first embodiment except that the rotor core 20 has two core parts 20B, one on each of both sides of the first core part 20A in the axial direction to that of the rotor core.

As described above, also in the second embodiment, the number N2 of the slits in the second core part 20B is smaller than the number N1 of the slits in the first core part 20A, and the ratio of the length of the second core part 20B in the axial direction to that of the rotor core 20 is greater than or equal to 70% and less than 100%. Thus, the eddy current loss can be reduced. Since the width W1 of the first magnet insertion hole 21A is wider than the width W2 of the second magnet insertion hole 21B, the demagnetization resistances of the first permanent magnets 22A and 22B can be made closer to each other. Further, the second permanent magnet 22B can be formed to be thinner than the first permanent magnet 22A, the manufacturing cost can be reduced.

Since the second core part 20B is provided on each of both sides of the first core part 20A in the axial direction, the weight balance of the rotor 2 in the axial direction can be enhanced.

Third Embodiment

Figure 16:
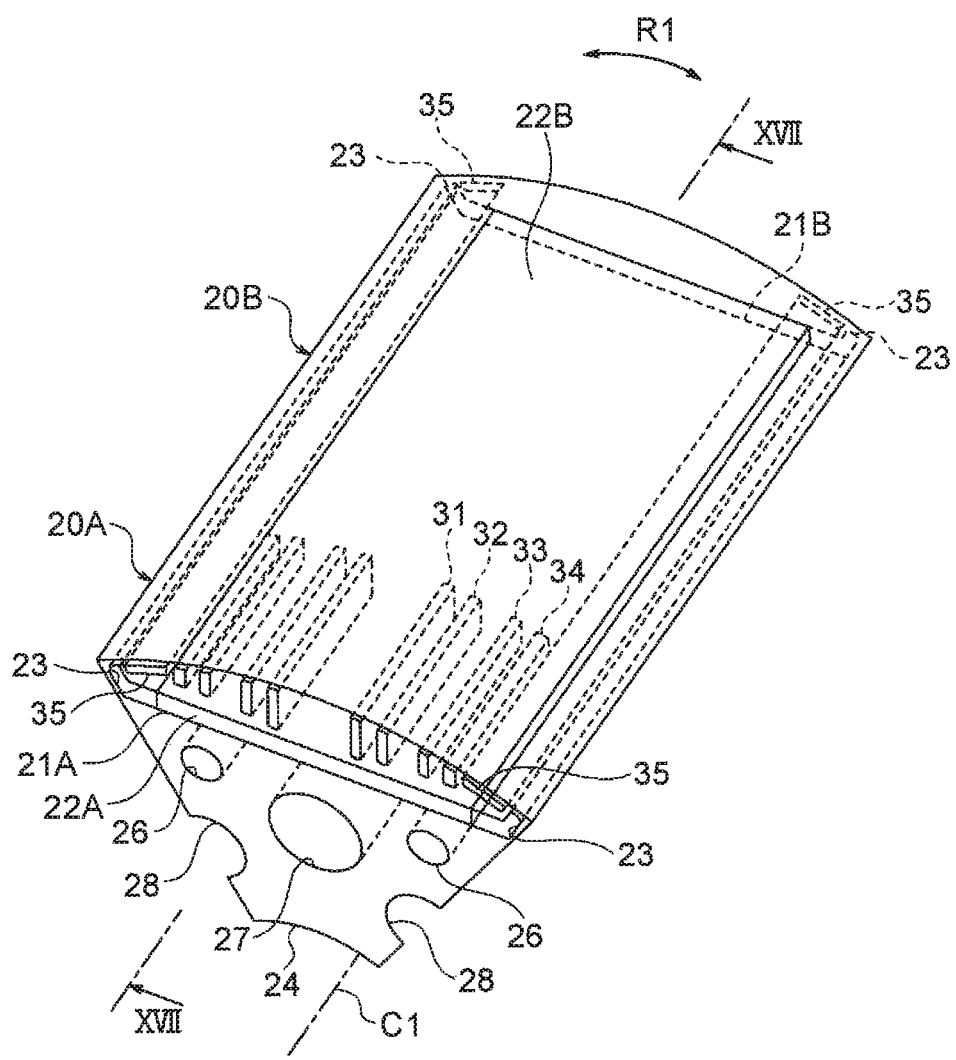
FIG. 16 is a perspective view schematically showing a portion corresponding to one magnetic pole of a rotor of a third embodiment.
Figure 17:
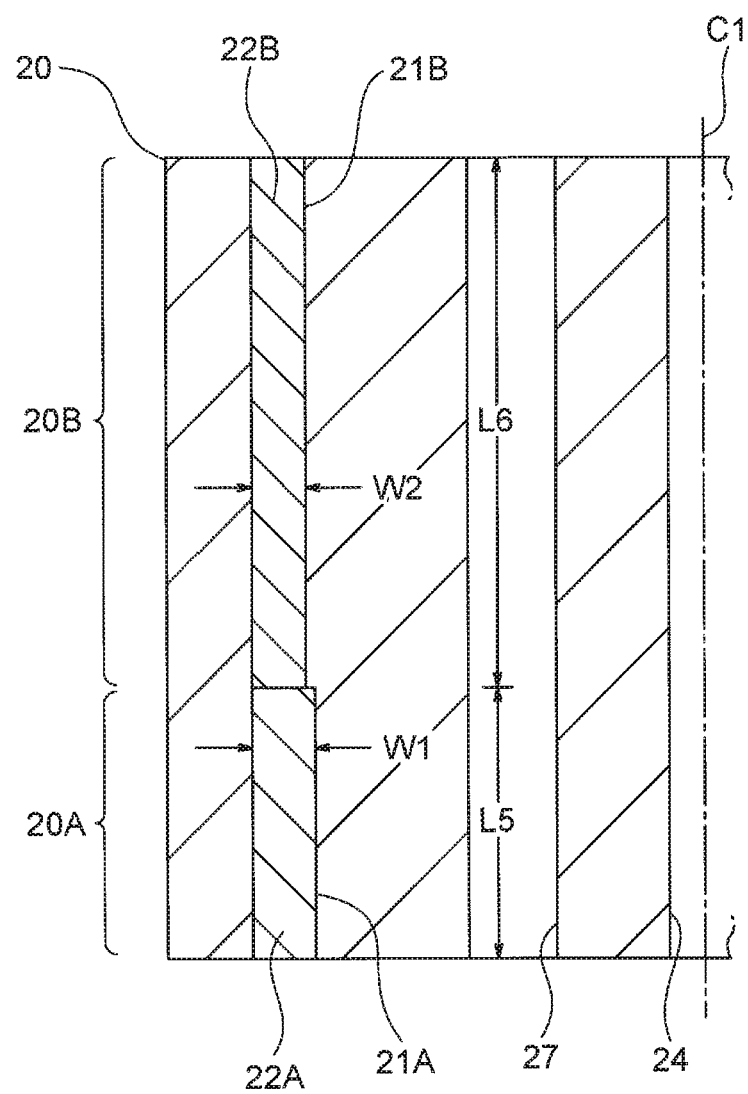
FIG. 17 is a longitudinal sectional view showing the rotor of the third embodiment.

Next, a third embodiment of the present invention will be described. FIG. 16 is a perspective view showing a portion corresponding to one magnetic pole of a rotor 2 in a motor of a third embodiment. FIG. 17 is a cross-sectional view taken along a line XVII-XVII in FIG. 16 as seen in a direction indicated by arrows, i.e., a longitudinal sectional view of the rotor 2.

The rotor core 20 of the above-described first embodiment includes two first core parts 20A and one second core part 20B, while the rotor core 20 of the second embodiment includes two second core parts 20B and one first core part 20A.

In contrast, the rotor core 20 of the third embodiment includes one first core part 20A and one second core part 20B. The first core part 20A has the same configuration as the first core part 20A (FIG. 5) of the first embodiment, while the second core part 20B has the same configuration as the second core part 20B (FIG. 6) of the first embodiment. The first core part 20A and the second core part 20B are provided to be adjacent to each other in the axial direction.

As shown in FIG. 17, the first core part 20A has a length L5 in the axial direction, while the second core part 20B has a length L6 in the axial direction. The width W1 of the first magnet insertion hole 21A is wider than the width W2 of the second magnet insertion hole 21B. The ratio of the length of the second core part 20B in the axial direction to that of the rotor core 20 is expressed as L6/(L5+L6). The ratio is greater than or equal to 70% and less than 100%.

Although the second core part 20B has no slit on the outer side of the second magnet insertion hole 21B in the radial direction, the second core part 20B may have slits, the number of which is N2 (<N1), on the outer side of the second magnet insertion hole 21B in the radial direction as described in the modifications (FIGS. 11 to 13).

The rotor core 20 is formed by stacking, in the axial direction, electromagnetic steel sheets each of which is punched into the shape of the first core part 20A shown in FIG. 5, and electromagnetic steel sheets each of which is punched into the shape of the second core part 20B shown in FIG. 6. The first permanent magnet 22A is inserted into the first magnet insertion hole 21A of the first core part 20A from one side (a lower side in FIG. 17) of the rotor core 20. The second permanent magnet 22B is inserted into the second magnet insertion hole 21B of the second core part 20B from the other side (an upper side in FIG. 17) of the rotor core 20.

The rotor 2 of the third embodiment has the same configuration as the rotor 2 of the first embodiment except that the rotor core 20 includes one first core part 20A and one second core part 20B.

As described above, according to the third embodiment, since the rotor core 20 includes one first core part 20A and one second core part 20B, the configuration of the rotor core 20 is simple and its assembly process is also simple, in addition to the effects described in the first embodiment. Thus, the manufacturing cost of the motor 100 can be enhanced.

In the above-described first to third embodiments and the modifications, the magnet insertion holes 21A and 21B extend linearly and perpendicularly to the magnetic pole center line M1, but the magnet insertion holes 21A and 21B are not limited to such an example. Specifically, the magnetic insertion hole 21A or 21B may extend in a V-shape such that a center in the circumferential direction protrudes inward in the radial direction. Moreover, a plurality of permanent magnets may be disposed in each magnet insertion hole.

(Scroll Compressor)

Figure 18:
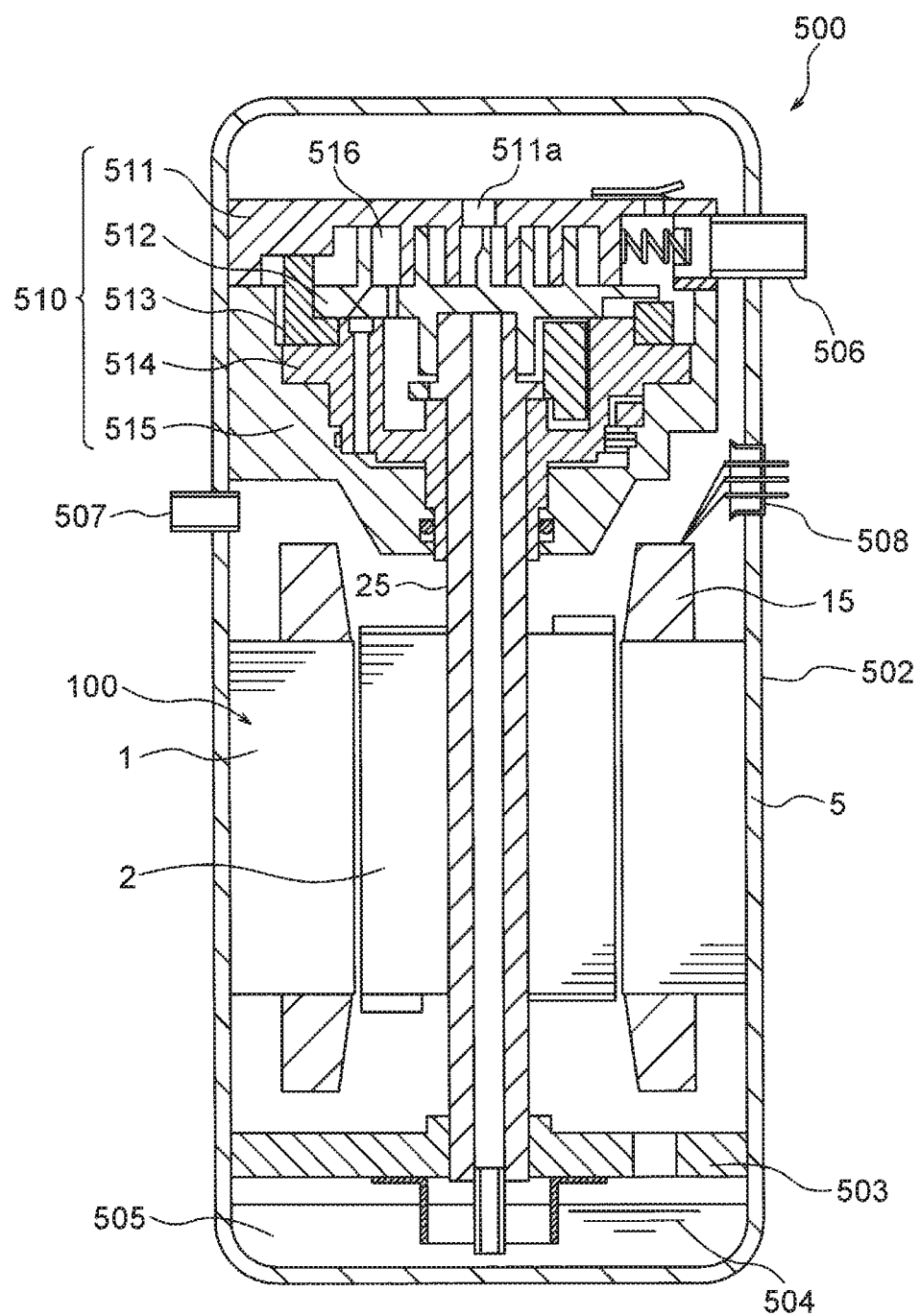
FIG. 18 is a diagram showing a compressor to which the motor of each embodiment is applicable.

Next, a compressor to which the motor of each of the first to third embodiments and the modifications described above is applicable will be described. FIG. 18 is a cross-sectional view showing a configuration of a compressor 500 that includes the motor 100 of the first embodiment. Instead of the motor 100 of the first embodiment, the motor of the second or third embodiment or each modification may be used.

The compressor 500 is a scroll compressor and includes, in a storage container 502, a compression mechanism 510, the motor 100 that drives the compression mechanism 510, a main shaft 501 that connects the compression mechanism 510 and the motor 100, a sub-frame 503 that supports an end portion (sub-shaft portion) of the main shaft 501 opposite to the compression mechanism 510, and a refrigeration machine oil 504 stored in an oil reservoir 505 at a bottom of the storage container 502.

The compression mechanism 510 includes a fixed scroll 511 and an orbiting scroll 512 which are combined to form a compression room between plate-shaped scroll teeth, an Oldham ring 513, a compliant frame 514, and a guide frame 515.

A suction pipe 506 passing through the storage container 502 is press-fitted to the fixed scroll 511. A discharge pipe 507 is provided to pass through the storage container 502. The discharge pipe 507 allows high-pressure refrigerant gas discharged from a discharge port of the fixed scroll 511 to be discharged to the outside (refrigeration cycle).

The storage container 502 includes a cylindrical shell 5 into which the motor 100 is fitted by shrink-fitting. In addition, a glass terminal 508 for electrically connecting the stator 1 of the motor 100 to a drive circuit is fixed to the storage container 502 by welding.

The motor 100 of each of the first to third embodiments and the modifications described above has the motor efficiency enhanced by reducing the eddy current loss. Thus, by using the motor 100 as a power source of the compressor 500, the operation efficiency of the compressor 500 can be enhanced, and thus consumption energy can be reduced.

Herein, the scroll compressor is described as an example of the compressor, but the motor of each embodiment and modification described above may be applied to any compressor other than the scroll compressor.

(Air Conditioner)

Figure 19:
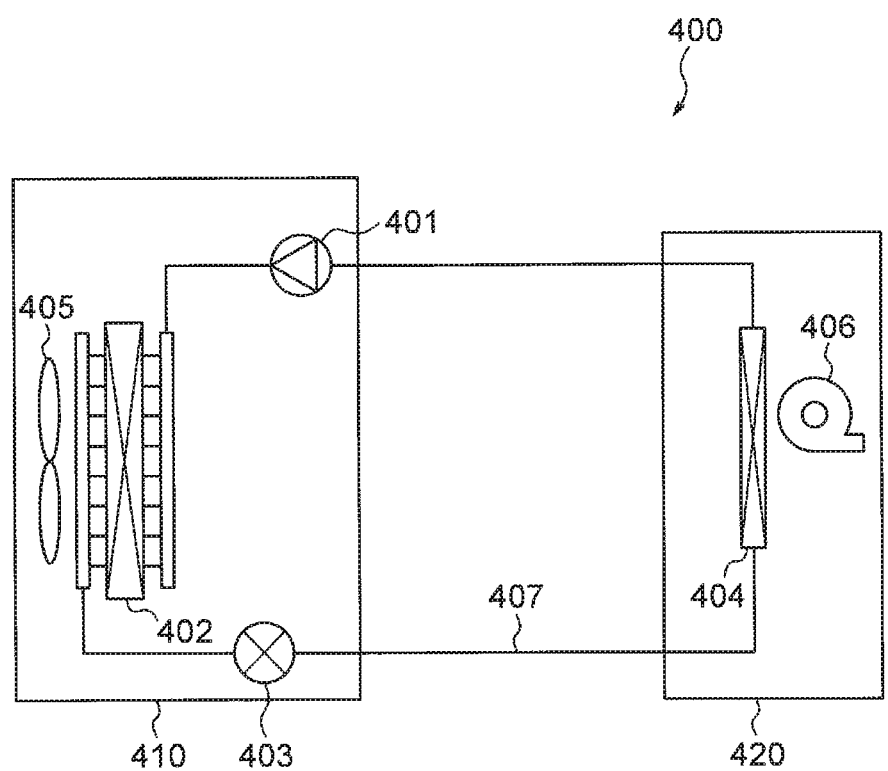
FIG. 19 is a diagram showing an air conditioner using the compressor shown in FIG. 18.

Next, an air conditioner 400 including the compressor 500 described above will be described. FIG. 19 is a diagram showing a configuration of the air conditioner 400. The air conditioner 400 shown in FIG. 19 includes a compressor 401, a condenser 402, a throttle device (a decompressor) 403, and an evaporator 404. The compressor 401, the condenser 402, the throttle device 403, and the evaporator 404 are connected together by a refrigerant pipe 407 to constitute a refrigeration cycle. That is, refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted by the compressor 500 illustrated in FIG. 18. The outdoor unit 410 is provided with an outdoor fan 405 that supplies outdoor air to the condenser 402. The evaporator 404 is provided in an indoor unit 420. The indoor unit 420 is provided with an indoor fan 406 that supplies indoor air to the evaporator 404.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air to condense and liquefy the refrigerant, and sends out the liquefied refrigerant to the refrigerant pipe 407. The outdoor fan 405 supplies the outdoor air to the condenser 402. The throttle device 403 changes its opening degree to adjust the pressure and the like of the refrigerant flowing through the refrigerant pipe 407.

The evaporator 404 exchanges heat between the refrigerant brought into a low-pressure state by the throttle device 403 and the indoor air to cause the refrigerant to take heat from the indoor air and evaporate (vaporize), and then sends out the evaporated refrigerant to the refrigerant pipe 407. The indoor fan 406 supplies indoor air to the evaporator 404. Thus, cooled air deprived of heat at the evaporator 404 is supplied into the room.

The motor 100 described in each of the first to third embodiments and the modifications is applicable to the compressor 401 (the compressor 500 in FIG. 18). Thus, the operation efficiency of the compressor 401 during operation of the air conditioner 400 can be enhanced, and the operational stability of the air conditioner 400 can be enhanced.

The compressor 500 to which the motor described in each of the first to third embodiments and the modifications is applied is not limited to the air conditioner 400 shown in FIG. 19, but may be used in other types of air conditioners.

Although the desirable embodiments of the present invention have been specifically described, the present invention is not limited to the above-described embodiments, and various modifications or changes can be made to those embodiments without departing from the scope of the present invention.

What is claimed is:

1. A rotor comprising:
   a rotor core having an annular shape about an axis, the rotor core having a first core part and a second core part in a direction of the axis, the first core part having a first magnet insertion hole, and the second core part having a second magnet insertion hole;
   a first permanent magnet disposed in the first magnet insertion hole and being formed of a rare earth magnet; and
   a second permanent magnet disposed in the second magnet insertion hole and being formed of a rare earth magnet,
   wherein a width of the first magnet insertion hole in a radial direction about the axis is wider than a width of the second magnet insertion hole in the radial direction,
   wherein the first core part has one or more slits, a number of which is N1, on an outer side of the first magnet insertion hole in the radial direction, the number N1 being greater than or equal to one, each of the slits having a length in the radial direction longer than a length in a circumferential direction about the axis, wherein the second core part has no, one or more slits, a number of which is N2, on an outer side of the second magnet insertion hole in the radial direction, the number N2 being greater than or equal to zero, each of the slits having a length in the radial direction longer than a length in the circumferential direction, wherein N1>N2 is satisfied, and wherein a ratio of a length of the second core part in the direction of the axis to a length of the rotor core in the direction of the axis is greater than or equal to 70% and less than 100%.

2. The rotor according to claim 1, wherein the ratio of the length of the second core part in the direction of the axis to the length of the rotor core in the direction of the axis is less than or equal to 90%.

3. The rotor according to claim 1, wherein the rotor core has two first core parts, one on each of both sides of the second core part in the direction of the axis.

4. The rotor according to claim 1, wherein the rotor core has two second core parts, one on each of both sides of the first core part in the direction of the axis.

5. The rotor according to claim 1, wherein the rotor core has one first core part and one second core part which are adjacent to each other in the direction of the axis.

6. The rotor according to claim 1, wherein the first magnet insertion hole and the second magnet insertion hole are continuous to each other in the direction of the axis.

7. The rotor according to claim 1, wherein outer end edges of the first magnet insertion hole and the second magnet insertion hole in the radial direction or inner end edges of the first magnet insertion hole and the second magnet insertion hole in the radial direction are located at a same position in the radial direction.

8. The rotor according to claim 1, wherein the slits in the first core part, the number of which is the number N1, are a plurality of slits formed symmetrically with respect to a straight line in the radial direction passing through a center of the first magnetic insertion hole in the circumferential direction.

9. The rotor according to claim 1, wherein the slits in the second core part, the number of which is the number N2, are a plurality of slits formed symmetrically with respect to a straight line in the radial direction passing through a center of the second magnetic insertion hole in the circumferential direction.

10. The rotor according to claim 1, wherein the first core part has a side slit on each of both ends of the first magnet insertion hole in the circumferential direction, the side slit having a length in the circumferential direction longer than a length in the radial direction, and wherein the second core part has a side slit on each of both ends of the second magnet insertion hole in the circumferential direction, the side slit having a length in the circumferential direction longer than a length in the radial direction.

11. The rotor according to claim 1, wherein the first magnet insertion hole extends linearly so as to be perpendicular to a straight line in the radial direction passing through a center of the first magnet insertion hole in the circumferential direction, and wherein the second magnet insertion hole extends linearly so as to be perpendicular to a straight line in the radial direction passing through a center of the second magnetic insertion hole in the circumferential direction.

12. The rotor according to claim 1, wherein the rotor core has a through hole passing through the rotor core in an axial direction.

13. A motor comprising:

the rotor according to claim 1, and a stator having a stator core surrounding the rotor, and a winding wound around the stator core.

14. The motor according to claim 13, wherein the stator core has a cutout portion on an outer circumference of the stator core.

15. The motor according to claim 13, wherein the winding has a conductor formed of copper or aluminum and an insulating film covering a surface of the conductor.

16. A compressor comprising:

a storage container;

a compression mechanism disposed in the storage container; and a motor driving the compression mechanism, wherein the motor comprises the rotor according to claim 1 and a stator surrounding the rotor so as to form an air gap between the rotor and the stator.

17. An air conditioner comprising a compressor, a condenser, a decompressor, and an evaporator, the compressor comprising:

a storage container;

a compression mechanism disposed in the storage container; and a motor driving the compression mechanism, the motor comprising:

the rotor according to claim 1; and a stator surrounding the rotor so as to form an air gap between the stator and the rotor.

* * * * *